US012375429B2

(12) United States Patent
Connor et al.

(10) Patent No.: US 12,375,429 B2
(45) Date of Patent: Jul. 29, 2025

(54) SWITCH-MANAGED RESOURCE ALLOCATION AND SOFTWARE EXECUTION

(71) Applicant: Intel Corporation, Santa Clara, CA (US)

(72) Inventors: Patrick Connor, Beaverton, OR (US); James R. Hearn, Hillsboro, OR (US); Kevin Liedtke, Portland, OR (US); Scott P. Dubal, Oregon City, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/768,909

(22) Filed: Jul. 10, 2024

(65) Prior Publication Data

US 2024/0364641 A1   Oct. 31, 2024

Related U.S. Application Data

(63) Continuation of application No. 16/905,761, filed on Jun. 18, 2020, now abandoned.

(51) Int. Cl.
  *H04L 49/356* (2022.01)
  *G06F 9/455* (2018.01)
  (Continued)

(52) U.S. Cl.
  CPC ........ *H04L 49/356* (2013.01); *G06F 9/45558* (2013.01); *H04L 47/125* (2013.01);
  (Continued)

(58) Field of Classification Search
  CPC ..... H04L 49/356; H04L 47/125; H04L 47/32; H04L 67/1097; H04L 69/22;
  (Continued)

(56) References Cited

U.S. PATENT DOCUMENTS 9,233,520 B2   1/2016   Kelsey
10,001,933 B1  6/2018   Johnson
(Continued)

FOREIGN PATENT DOCUMENTS

JP   2009027755 A   2/2009
JP   2012528552 A   11/2012
(Continued)

OTHER PUBLICATIONS

Office Action from Japanese Patent Application No. 2022-568889 notified Aug. 16, 2024, 14 pgs.
(Continued)

*Primary Examiner* — Habte Mered
(74) *Attorney, Agent, or Firm* — Essential Patents Group, LLP; Christopher K. Gagne

(57) ABSTRACT

Examples described herein relate to a switch device for a rack of two or more physical servers, wherein the switch device is coupled to the two or more physical servers and the switch device performs packet protocol processing termination for received packets and provides payload data from the received packets without a received packet header to a destination buffer of a destination physical server in the rack. In some examples, the switch device comprises at least one central processing unit, the at least one central processing unit is to execute packet processing operations on the received packets. In some examples, a physical server executes at least one virtualized execution environments (VEE) and the at least one central processing unit executes a VEE for packet processing of packets with data to be accessed by the physical server that executes the VEE.

35 Claims, 21 Drawing Sheets

(51) Int. Cl.
  *H04L 47/125* (2022.01)
  *H04L 47/32* (2022.01)
  *H04L 67/1097* (2022.01)
  *H04L 69/22* (2022.01)
(52) U.S. Cl.
  CPC .......... *H04L 47/32* (2013.01); *H04L 67/1097* (2013.01); *H04L 69/22* (2013.01); *G06F 2009/4557* (2013.01); *G06F 2009/45583* (2013.01); *G06F 2009/45595* (2013.01)
(58) Field of Classification Search
  CPC . H04L 12/4645; H04L 67/00; H04L 63/0227; H04L 63/0272; H04L 63/1408; H04L 63/166; H04L 67/02; H04L 69/161; H04L 67/34; G06F 9/45558; G06F 2009/4557; G06F 2009/45583; G06F 2009/45595
  See application file for complete search history.

(56) References Cited

U.S. PATENT DOCUMENTS

| | | | |
|---|---|---|---|
| 10,263,832 | B1 | 4/2019 | Ghosh |
| 10,412,002 | B1 | 9/2019 | Richardson et al. |
| 11,461,123 | B1 | 10/2022 | Tsai et al. |
| 2008/0126507 | A1 | 5/2008 | Wilkinson |
| 2010/0064070 | A1 | 3/2010 | Yoshimura et al. |
| 2013/0114607 | A1 | 5/2013 | McGovern |
| 2014/0013066 | A1 | 1/2014 | Lim et al. |
| 2014/0032795 | A1 | 1/2014 | Krause |
| 2015/0222443 | A1 | 8/2015 | Basso et al. |
| 2015/0227312 | A1 | 8/2015 | Feehrer et al. |
| 2017/0052916 | A1 | 2/2017 | Kollu |
| 2017/0063631 | A1 | 3/2017 | Curtis et al. |
| 2017/0090987 | A1 | 3/2017 | Hearn et al. |
| 2017/0264493 | A1 | 9/2017 | Cencini et al. |
| 2019/0044705 | A1 | 2/2019 | Deval et al. |
| 2019/0044893 | A1 | 2/2019 | Richardson et al. |
| 2019/0391835 | A1 | 12/2019 | Gowda et al. |
| 2020/0026656 | A1* | 1/2020 | Liao .................... H04L 67/1097 |
| 2020/0104275 | A1* | 4/2020 | Sen ......................... G06F 9/544 |
| 2021/0184795 | A1* | 6/2021 | Ibars Casas .......... H04W 88/08 |
| 2025/0036590 | A1* | 1/2025 | Malladi ................. G06F 3/0604 |

FOREIGN PATENT DOCUMENTS

| | | |
|---|---|---|
| WO | 2009057204 A1 | 5/2009 |
| WO | 2019108102 A1 | 6/2019 |

OTHER PUBLICATIONS

Extended European Search Report from European Patent Application No. 20940730.3 notified Apr. 2, 2024, 8 pgs.
Final Office Action from U.S. Appl. No. 16/905,761 notified May 7, 2024, 34 pgs.
International Search Report and Written Opinion from PCT/US2020/064670 notified Mar. 15, 2021, 13 pgs.
Non-Final Office Action from U.S. Appl. No. 16/905,761 notified Oct. 5, 2023, 34 pgs.
ARISTA, "A Layman's guide to Layer 1 Switching", ARISTA White Paper, Copyright Arista Networks, Inc., Dec. 19, 2018, 4 pgs.
Barr, Jeff, "New—TLS Termination for Network Load Balancers", AWS News Blog, <https://aws.amazon.com/blogs/aws/news-tls-termination-for-network-load-balancers/> Jan. 24, 2019, 7 pgs.
Chamings, James E., "An Overview of Advanced Server-Based Networking technologies", <https://www.intel.com/content/www/us/en/developer/articles/technical/an-overview-of-advanced-server-based-networking-technologies.html> published Oct. 9, 2017, 10 pgs.
Das, Sujal, "Server-based open networking taxes the CPU, so offload to an intelligent server adapter", Network World <https://www.networkworld.com/articles/3142401/server-based-open-networking-taxes-the-cpu-so-offload-to-an-intelligent-server-adapter.html> Nov. 17, 2016, 6 pgs.
Duffy, Jim, "Will enhanced servers do away with need for switches?", CIO <https://www2.cio.com/au/article/563428/will-enhanced-servers-do-away-need-switches/> Jan. 8, 2015, 4 pgs.
Fietz, Jonas, et al., "VNToR: Network Virtualization at the Top-of-Rack Switch", 2016 ACM, Oct. 5-7, 2016, 14 pgs.
Luo, Yan, et al., "Accelerated Virtual Switching with programmable NICs for Scalable Data Center Networking", Copyright 2010 ACM, Sep. 3, 2010, 8 pgs.
Ram, Kaushik Kumar, et al., "Hyper-Switch: A Scalable Software Virtual Switching Architecture", 2013 USENIX Annual Technical Conference (USENIX ATC '13) Jun. 4, 2013, 12 pgs.
Wirbel, Loring, "Intel's FM10000 Is a Switch, Controller" , Linley Newsletter <https://www.linleygroup.com/newsletters/newsletter_detail.php?num=5427> Nov. 24, 2015, 1 pg.
Zilberman, Noa, et al., "Stardust: Divide and Conquer in the Data Center Network", Proceedings of the 16th USENIX Symposium on Networked Systems Design and Implementation (NSDI '19) Feb. 26-28, 2019, Boston, MA, USA, 20 pgs.
Extended European Search Report from European Patent Application No. 24198005.1 notified Jan. 22, 2025, 9 pgs.
Office Action from Japanese Patent Application No. 2022-568889 notified Feb. 4, 2025, 5 pgs.

* cited by examiner

US 12,375,429 B2

SWITCH-MANAGED RESOURCE ALLOCATION AND SOFTWARE EXECUTION

CLAIM OF PRIORITY

This application is a continuation of co-pending prior U.S. patent application Ser. No. 16/905,761, filed on Jun. 18, 2020, entitled "SWITCH-MANAGED RESOURCE ALLOCATION AND SOFTWARE EXECUTION," which is hereby incorporated herein by reference in its entirety.

DESCRIPTION

In the context of cloud computing, cloud service providers (CSPs) offer various services to other companies or individuals for use such as infrastructure as a service (IaaS), software as a service (SaaS) or platform as a service (PaaS). A hardware infrastructure including compute, memory, storage, accelerators, networking, and so forth executes and supports software stacks provided by the CSPs and their customers.

CSPs can have experience complex networking environments where packets are parsed, de-encapsulated, decrypted, and sent to a proper virtual machine (VM). In some cases, packet flows are balanced and metered to achieve service level agreement (SLA) requirements. In some cases, network processing occurs in the servers within a datacenter. However, with increased volumes of packets and increased amounts and complexity of packet processing activities, a burden on the servers is increasing. Central processing units (CPUs) or other server processor resources are used for packet processing, but CPUs and other processor resources can be used for other services that are billable or generate higher revenue than packet processing. The impact of this problem is significantly increased when using high bit-rate network devices such as the 100 Gbps and higher speed networks.

DETAILED DESCRIPTION

Figure 1A:
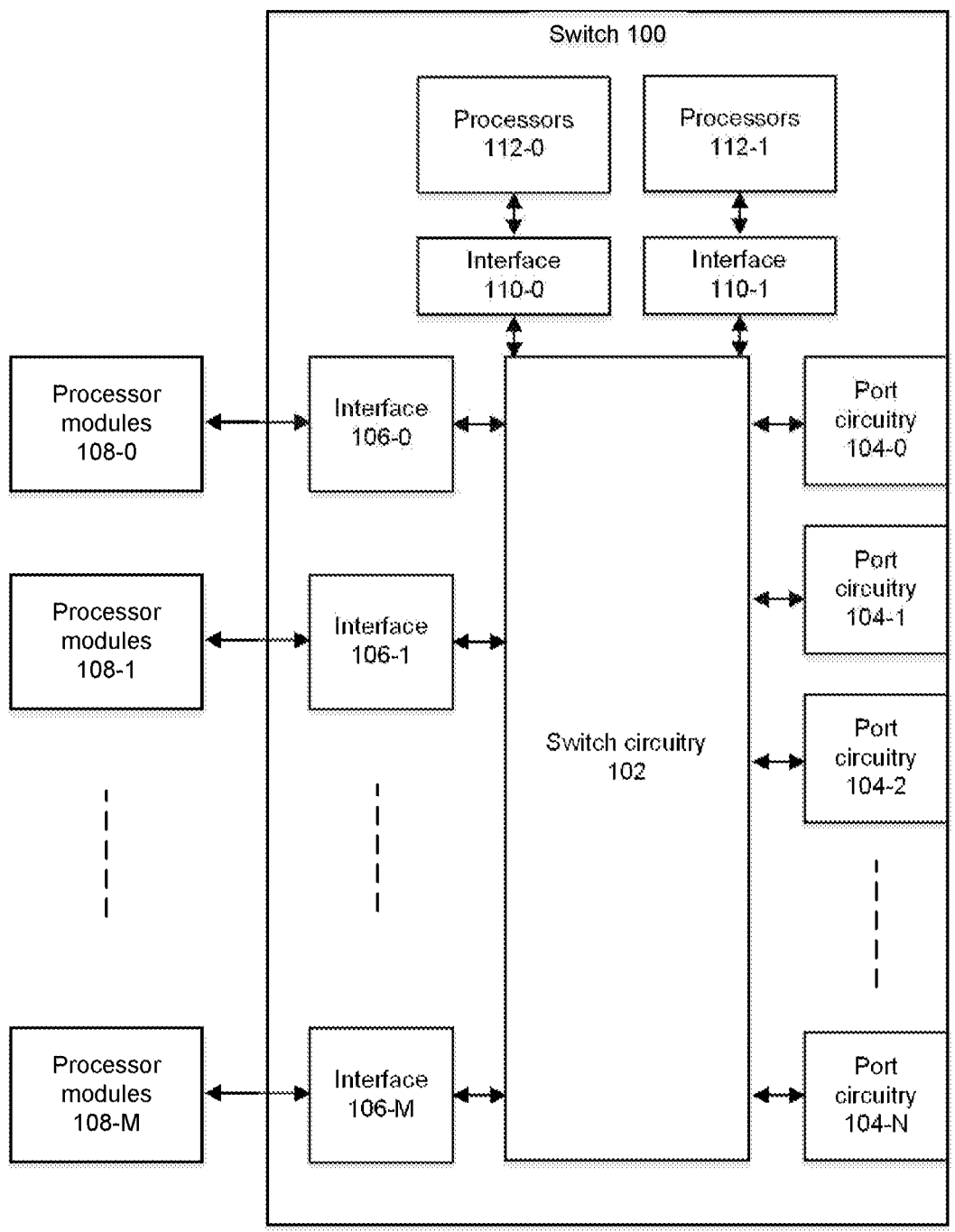
FIGS. 1A-1D depict example switch systems.

Within a data center, north-south traffic can include packets that flow in or out of the data center whereas east-west traffic can include packets that flow between nodes (e.g., racks of servers) within the data center. North-south traffic can be considered a product for serving customers, whereas east-west traffic can be considered overhead. The amount of east-west traffic has been growing at a rate that is significantly higher than north-south traffic and processing east-west traffic flow in a timely manner to comply with applicable SLAs while reducing data center total cost of ownership (TCO) is a growing challenge within the data-center.

Increasing networking speeds within a data center (e.g., 100 Gbps Ethernet and above) to provide for faster traffic rates within the data center is a manner of addressing traffic growth. However, an increase in network speed can involve even more packet processing activities, which use processor resources that could otherwise be used for other tasks.

Some solutions reduce CPU utilization and accelerate packet processing by offloading the tasks to network controller hardware with specialized hardware. However, specialized hardware may be limited to current day workloads and not be flexible to handle future, different workloads or packet processing activities.

Some solutions seek to reduce the overhead of packet processing through simplified protocols but still use significant CPU utilization to perform packet processing.

System Overview

Various embodiments provide for attempting to reduce server processor utilization and attempting to reduce or control growth of east-west traffic within a data center while providing sufficiently fast packet processing. Various embodiments provide a switch with infrastructure offload capabilities including one or more CPUs or other accelerator devices inclusively. Various embodiments provide a switch with certain packet processing network interface card (NIC) functionality to allow the switch to perform packet processing or network termination and freeing server CPUs to perform other tasks. The switch can include or access server class processors, switching blocks, accelerators, offload engines, ternary content-addressable memory (TCAM) and packet processing pipelines. The packet processing pipeline (s) could be programmable via P4 or other programming languages. The switch can be connected to one or more CPUs or host servers using various connections. For example, direct attach copper (DAC), fiber optic cable, or other cables can be used to connect the switch with one or more CPUs, compute hosts, servers, including servers in a rack. In some examples, connections can be less than 6 feet in length to reduce bit error rate (BER). Note that reference to a switch can refer to multiple connected switches or a distributed switch and a rack may include multiple switches to logically split a rack into two half racks or into pods (e.g., one or more racks).

Various embodiments of the rack switch can be configured to perform one or more of: (1) telemetry aggregation via high speed connections of packet transmit rates, response latency, cache misses, virtualized execution environment requests, and so forth; (2) orchestration of server resources connected to the switch based at least on telemetry; (3) orchestration of virtual execution environments executing on various servers based at least on telemetry; (4) network termination and protocol processing; (5) memory transaction completion by retrieving data associated with a memory transaction and providing the data to the requester or forwarding the memory transaction to a target that can retrieve the data associated with the memory transaction; (6) caching of data for access by one or more servers in the rack or group of racks; (7) Memcached resource management at the switch; (8) execution of one or more virtualized execution environments to perform packet processing (e.g., header processing in accordance with applicable protocols); (9) management of execution of virtualized execution environments in the switch or in a server or both for load balancing or redundancy; or (10) migration of virtualized execution environments between the switch and a server or server to server. Accordingly, by enhancement to operations of a rack switch, server CPU cycles can be freed to use for billable or value add services.

Various embodiments can terminate network processing in the switch, in place of a server. For example, the switch can perform protocol termination, decryption, decapsulation, acknowledgements (ACKs), integrity checks, and network-related tasks can be performed by a switch and not handled by the server. The switch can include specialized offload engines for known protocols or calculations and be extensible or programmable to process new protocols or vendor specific protocols via software or field programmable gate (FPGA) to flexibly support future needs.

Network termination at the switch can reduce or eliminate transfers of data for processing by multiple VEEs that are potentially on different servers or even different racks for service function chain processing. The switch can perform network processing and provide the resulting data, after processing, to the destination server within the rack.

In some examples, the switch can manage memory input/output (I/O) requests by directing memory I/O requests to the target device instead of to a server for the server to determine a target device and the server transmitting the I/O request to another server or target device. Servers can include a memory pool, storage pool or server, compute server, or provide other resources. Various embodiments can be used in a scenario where a server 1 issues an I/O request to access memory where a near memory is accessed from a server 2 and a far memory is accessed from a server 3 (e.g., 2 level memory (2LM), memory pooling, or thin memory provisioning). For example, the switch can receive a request from server 1 that requests a read or write to memory directed to system 2. The switch can be configured to identify that a memory address referenced by the request is in a memory associated with a server 3 and the switch can forward the request to server 3 instead of sending the request to server 2, which would transmit the request to server 3. As such, the switch can reduce a time taken to complete a memory transaction. In some examples, the switch can perform caching of data on the same rack to reduce east-west traffic for subsequent requests for the data.

Note that the switch can notify server 2 that an access to memory of server 3 has taken place so that server 2 and server 3 can maintain coherency or consistency of the data associated with the memory address. If server 2 has posted writes or dirties (modifies) cache lines, coherency protocols and/or producer consumer models can be used to maintain consistency of data stored in server 2 and server 3.

In some examples, the switch can execute orchestration, hypervisor functionality, as well as manage service chain functionality. The switch can orchestrate processor and memory resources and virtual execution environment (VEE) execution for an entire rack of servers to provide aggregated resources of a rack as a single, composite server. For example, the switch can allocate use of compute sleds, memory sleds, and accelerator sleds for execution by one or more VEEs.

In some examples, the switch is positioned top-of-rack (TOR) or middle of rack (MOR) relative to connected servers to reduce a length of connection between the switch and servers. For example, for a switch positioned TOR (e.g., furthest from the floor of the rack), servers connect to the switch so that copper cabling from the servers to the rack switch stay within the rack. The switch can link the rack to the data center network with fiber optic cable running from the rack to an aggregation region. For a MOR switch position, the switch is positioned towards the center of the rack between the bottom of the rack and the top of the rack. Other rack positions for switch can be used such as end of rack (EOR).

FIG. 1A depicts an example switch system. Switch 100 can include or access switch circuitry 102 that is communicatively coupled to port circuitry 104-0 to 104-N. Port circuitry 104-0 to 104-N can receive packets and provide packets to switch circuitry 102. When port circuitry 104-0 to 104-N is Ethernet compatible, port circuitry 104-0 to 104-N can include a physical layer interface (PHY) (e.g., physical medium attachment (PMA) sublayer, Physical Medium Dependent (PMD), a forward error correction (FEC), and a physical coding sublayer (PCS)), media access control (MAC) encoding or decoding, and a Reconciliation Sublayer (RS). An optical-to-electrical signal interface can provide electrical signals to the network port. Modules can be built using a standard mechanical and electrical form factors such as the Small Form-factor Pluggable (SFP), Quad Small Form-factor Pluggable (QSFP), Quad Small Form-factor Pluggable Double Density (QSFP-DD), Micro QSFP, or OSFP (Octal Small Format Pluggable) interfaces, described in Annex 136C of IEEE Std 802.3cd-2018 and references therein, or other form factors.

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

A flow can be a sequence of packets being transferred between two endpoints, generally representing a single session using a known protocol. Accordingly, a flow can be identified by a set of defined N tuples and, for routing purpose, a flow can be identified by tuples that identify the endpoints, e.g., the source and destination addresses. For content based services (e.g., load balancer, firewall, intrusion detection system etc.), flows can be identified at a finer granularity by using five or more tuples (e.g., source address, destination address, IP protocol, transport layer source port, and destination port). A packet in a flow is expected to have the same set of tuples in the packet header. A flow can be unicast, multicast, anycast, or broadcast.

Switch circuitry 102 can provide connectivity to, from, and among multiple servers and performs one or more of: traffic aggregation, and match action tables for routing, tunnels, buffering, VxLAN routing, Network Virtualization using Generic Routing Encapsulation (NVGRE), Generic Network Virtualization Encapsulation (Geneve) (e.g., currently a draft Internet Engineering Task Force (IETF) standard), and access control lists (ACLs) to permit or inhibit progress of a packet.

Processors 108-0 to 108-M can be coupled to switch circuitry 102 via respective interfaces 106-0 to 106-M. Interfaces 106-0 to 106-M can provide a low latency, high bandwidth memory-based interface such as Peripheral Component Interconnect express (PCIe), Compute Express Link (CXL), memory interface (e.g., any type of Double Data Rate (DDRx), CXL.io, CXL.cache, or CXL.mem), and/or a network connection (e.g., Ethernet or InfiniBand). In cases where a memory interface is used, the switch can be identified as a memory address.

One or more of processor modules 108-0 to 108-M can represent servers with CPUs, random access memory (RAM), persistent or non-volatile storage, accelerators and the processor modules could be one or more servers in the rack. For example, processor modules 108-0 to 108-M can represent multiple distinct physical servers that are communicatively coupled to switch 100 using connections. A physical server can be distinct from another physical server by providing different physical CPU devices, random access memory (RAM) devices, persistent or non-volatile storage devices, or accelerator devices. Distinct physical servers can, however, include the devices with the same performance specifications. A server, as used herein, can refer to a physical server or a composite server that aggregates resources from one or more distinct physical servers.

Processor modules 108-0 to 108-M and processor 112-0 or 112-1 can include one or more cores and system agent circuitry. A core can be an execution core or computational engine that can execute instructions. A core can access to its own cache and read only memory (ROM), or multiple cores can share a cache or ROM. Cores can be homogeneous (e.g., same processing capabilities) and/or heterogeneous devices (e.g., different processing capabilities). Frequency or power use of a core can be adjustable. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Cores may be coupled via an interconnect to a system agent (uncore).

System agent can include a shared cache which may include any type of cache (e.g., level 1, level 2, or last level cache (LLC)). System agent can include or more of: a memory controller, a shared cache, a cache coherency manager, arithmetic logic units, floating point units, core or processor interconnects, or bus or link controllers. System agent or uncore can provide one or more of: direct memory access (DMA) engine connection, non-cached coherent master connection, data cache coherency between cores and arbitrates cache requests, or Advanced Microcontroller Bus Architecture (AMBA) capabilities. System agent or uncore can manage priorities and clock speeds for receive and transmit fabrics and memory controllers.

Cores can be communicatively connected using a high-speed interconnect compatible with any of but not limited to Intel QuickPath Interconnect (QPI), Intel Ultra Path Interconnect (UPI), Intel On-Chip System Fabric (IOSF), Omnipath, Compute Express Link (CXL). The number of core tiles is not limited to this example can be any number such as 4, 8, and so forth.

As is described in more detail herein, an orchestration control plane, Memcached server, one or more virtualized execution environments (VEEs) can execute on one or more of processor modules 108-0 to 108-M or on processor 112-0 or 112-1.

A VEE can include at least a virtual machine or a container. A virtual machine (VM) can be software that runs an operating system and one or more applications. A VM can be defined by specification, configuration files, virtual disk file, non-volatile random-access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings.

Various embodiments provide driver software for various operating systems (e.g., VMWare®, Linux®, Windows® Server, FreeBSD, Android®, MacOS®, iOS®, or any other operating system) for applications or VEEs to access switch 100. In some examples, the driver can present the switch as a peripheral device. In some examples, the driver can present the switch as a network interface controller or network interface card. For example, a driver can provide a VEE with ability to configure and access the switch as a PCIe endpoint. In some examples, a virtual function driver such as Adaptive Virtual Function (AVF) can be used to access the switch. An example of AVF is described at least in "Intel® Ethernet Adaptive Virtual Function Specification" Revision 1.0 (2018). In some examples, a VEE can interact with a driver to turn on or off any feature of the switch described herein.

Device drivers (e.g., NDIS-Windows, NetDev-Linux for example) running on processor modules 108-0 to 108-M can bind to switch 100 and advertise capabilities of switch 100 to a host operating system (OS) or any OS executed in a VEE. An application or VEE can configure or access switch 100 using SIOV, SR-IOV, MR-IOV, or PCIe transactions. By incorporating a PCIe endpoint as an interface switch 100, switch 100 can be enumerated on any of processor modules 108-0 to 108-M as a PCIe Ethernet or CXL device as a locally attached Ethernet device. For example, switch 100 can be presented as a physical function (PF) to any server (e.g., any of processor modules 108-0 to 108-M). When a resource (e.g., memory, accelerator, networking, CPU) of switch 100 is allocated to a server, the resource could appear logically to the server as if attached via a high-speed link (e.g., CXL or PCIe). The server could access the resource (e.g., memory or accelerator) as a hot plugged resource. Alternatively, these resources could appear as pooled resources that are now available to the server.

In some examples, processor modules 108-0 to 108-M and switch 100 can support use of single-root I/O virtualization (SR-IOV). PCI-SIG Single Root IO Virtualization and Sharing Specification v1.1 and predecessor and successor versions describe use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that can configure and manage the SR-IOV functionality. For example, a PF can configure or control a PCIe device, and the PF has ability to move data in and out of the PCIe device. For example, for switch 100, the PF is a PCIe function of switch 100 that supports SR-IOV. The PF includes capability to configure and manage SR-IOV functionality of switch 100, such as enabling virtualization and managing PCIe VFs. A VF is associated with a PCIe PF on switch 100, and the VF represents a virtualized instance of switch 100. A VF can have its own PCIe configuration space but can share one or more physical resources on switch 100, such as an external network port, with the PF and other PFs or other VFs. In other examples, an opposite relationship can be used where any server (e.g., processor modules 108-0 to 108-M) is represented as a PF and a VEE executing on switch 100 can utilize a VF to configure or access any server.

In some examples, platform 1900 and NIC 1950 can interact using Multi-Root IOV (MR-IOV). Multiple Root I/O Virtualization (MR-IOV) and Sharing Specification, revision 1.0, May 12, 2008, from the PCI Special Interest Group (SIG), is a specification for sharing PCI Express (PCIe) devices among multiple computers.

In some examples, processor modules 108-0 to 108-M and switch 100 can support use of Intel® Scalable I/O Virtualization (SIOV). For example, processor modules 108-0 to 108-M can access switch 100 as a SIOV capable device or switch 100 can access processor modules 108-0 to 108-M as SIOV capable devices. A SIOV capable device can be configured to group its resources into multiple isolated Assignable Device Interfaces (ADIs). Direct Memory Access (DMA) transfers from/to each ADI are tagged with a unique Process Address Space identifier (PASID) number. Switch 100, processor modules 108-0 to 108-M, network controllers, storage controllers, graphics processing units, and other hardware accelerators can utilize SIOV across many virtualized execution environments. Unlike the coarse-grained device partitioning approach of SR-IOV to create multiple VFs on a PF, SIOV enables software to flexibly compose virtual devices utilizing the hardware-assists for device sharing at finer granularity. Performance critical operations on the composed virtual device are mapped directly to the underlying device hardware, while non-critical operations are emulated through device-specific composition software in the host. A technical specification for SIOV is Intel® Scalable I/O Virtualization Technical Specification, revision 1.0, June 2018.

Multitenant security can be employed where switch 100 is granted access to some or all server resources in the rack. Accesses by switch 100 to any server can require use of crypto keys, checksums, or other integrity checks. Any server can employ an access control list (ACL) to ensure communications from switch 100 are permitted but can filter out communications from other sources (e.g., drop communications).

Examples of packet transmission using switch 100 are described next. In some examples, switch 100 acts a network proxy for a VEE running on a server. A VEE executing on switch 100 can form the packets for transmission using a network connection of switch 100 according to any applicable communications protocol (e.g., standardized or proprietary protocol). In some examples, switch 100 can originate a packet transmission where a workload or VEE running on the cores is in switch 100 or accessible to switch 100. Switch 100 can access connected internal cores in a similar manner as accessing any other externally connected host. One or more host(s) can be placed inside the same chassis as switch 100. In some examples where a VEE or service runs on a CPU of switch 100, such VEE can originate packets for transmission. For example, where a VEE runs a Memcached server on a CPU of switch 100, switch 100 could originate packets for transmission to respond to any request for data or in the case of cache miss, query another server or system for the data and retrieve data to update its cache.

Figure 1B:
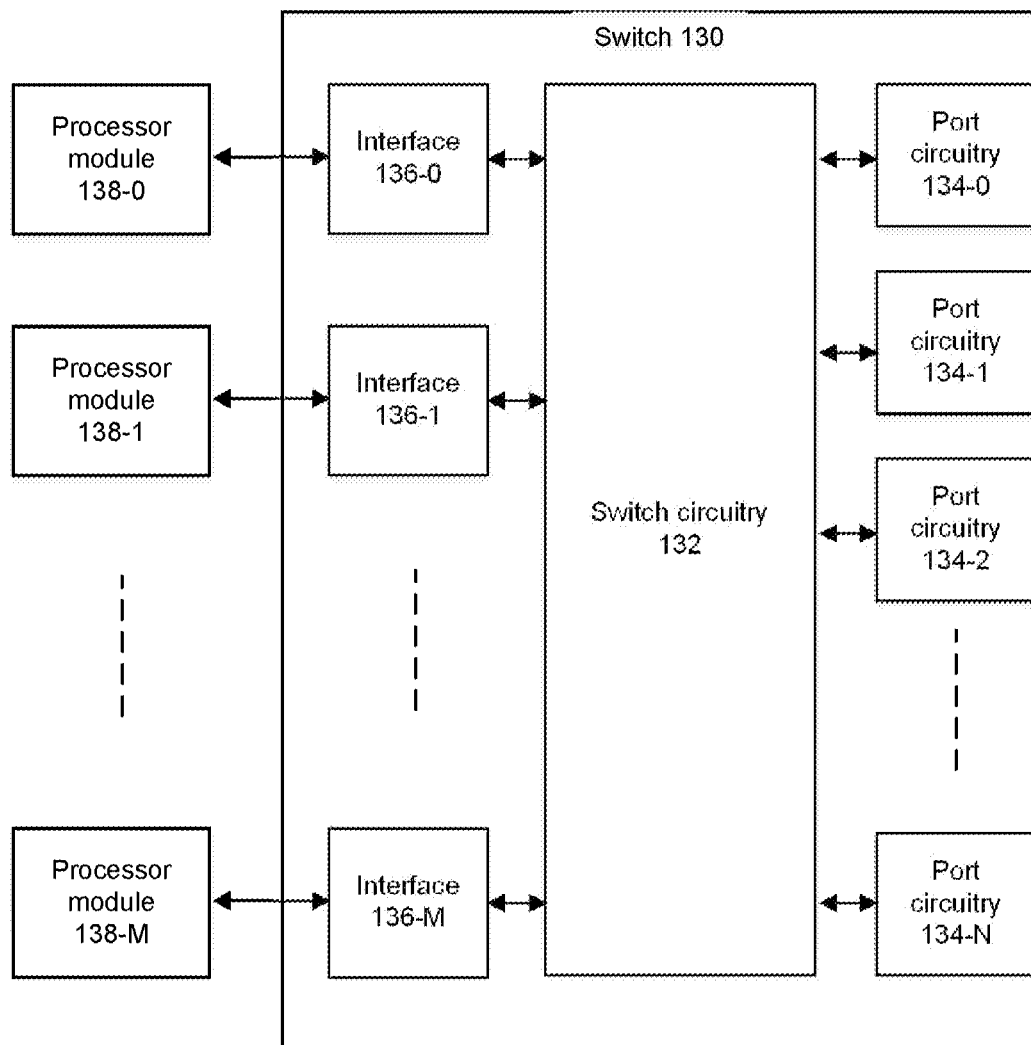

FIG. 1B depicts an example system. Switch system 130 can include or access switch circuitry 132 that is communicatively coupled to port circuitry 134-0 to 134-N. Port circuitry 134-0 to 134-N can receive packets and provide packets to switch circuitry 132. Port circuitry 134-0 to 134-N can be similar to any of port circuitry 104-0 to 104-N. Interfaces 136-0 to 136-M can provide communication with respective processor modules 138-0 to 138-M. As is described in more detail herein, an orchestration control plane, Memcached server, or one or more virtualized execution environments (VEEs) running any application (e.g., webserver, database, Memcached server) can execute on one or more of processor modules 138-0 to 138-M. Processor modules 138-0 to 138-M can be similar to respective processor modules 108-0 to 108-M.

Figure 1C:
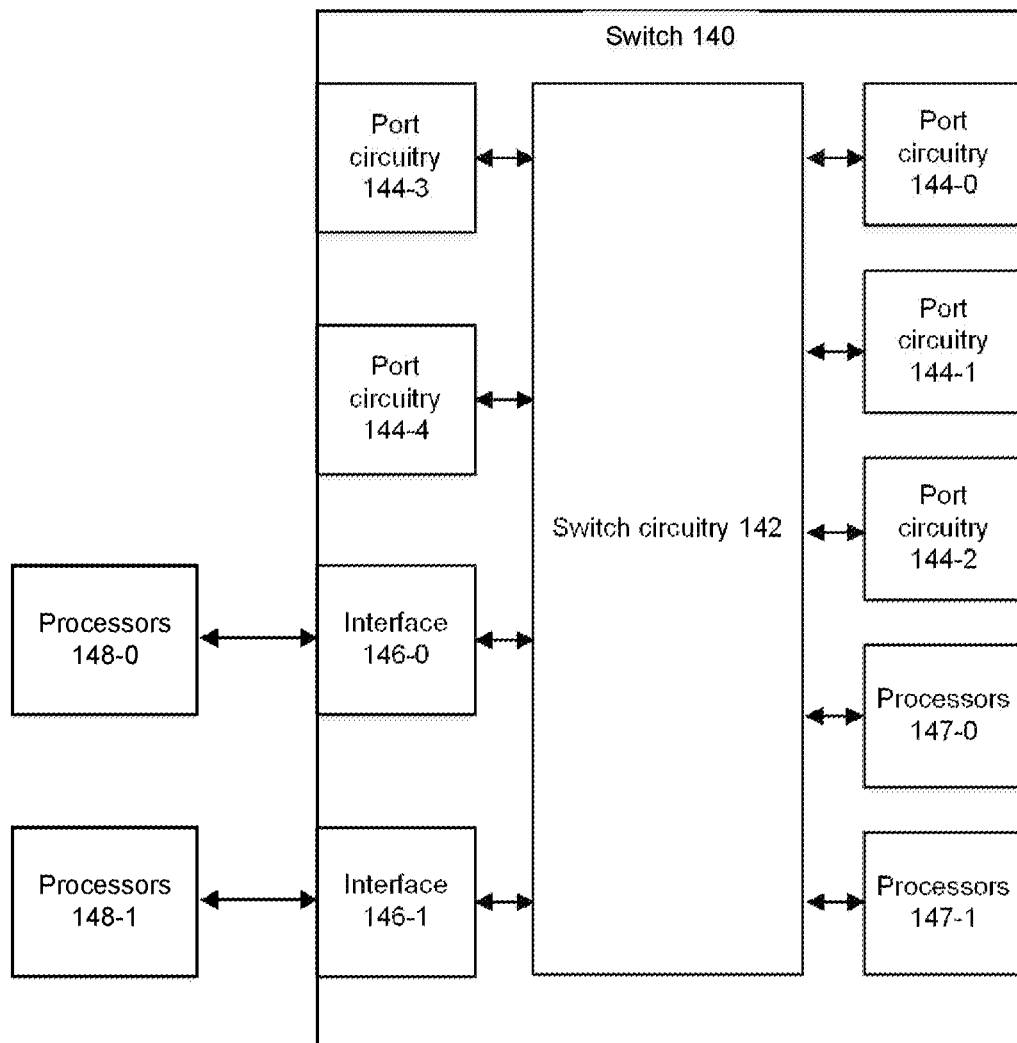

FIG. 1C depicts an example system. Switch system 140 can include or access switch circuitry 142 that is communicatively coupled to port circuitry 144-0 to 144-4. Port circuitry 144-0 to 144-4 can receive packets and provide packets to switch circuitry 142. Port circuitry 144-0 to 144-N can be similar to any port circuitry 104-0 to 104-N. Interfaces 146-0 to 146-1 can provide communication with respective processor modules 148-0 to 148-1. As is described in more detail herein, an orchestration control plane, Memcached server, or one or more virtualized execution environments (VEEs) running any application (e.g., webserver, database, Memcached server) can execute on one or more of processors 147-0 or 147-1 or processor modules 148-0 to 148-1. Processor modules 148-0 to 148-1 can be similar to any of processor modules 108-0 to 108-M.

Figure 1D:
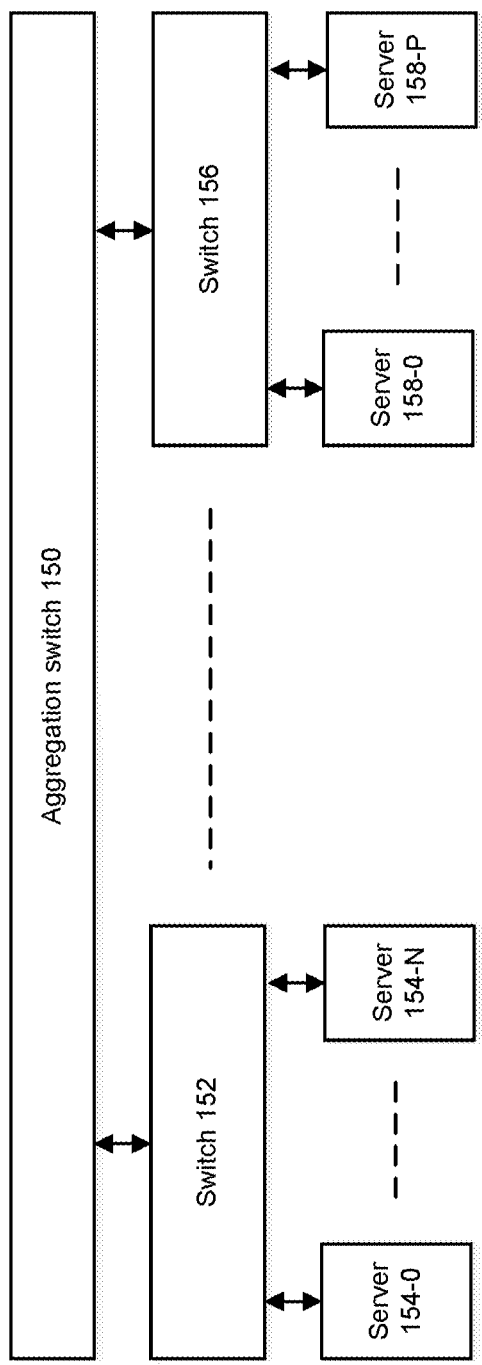

FIG. 1D depicts an example system. In this example, aggregation switch 150 is coupled to multiple switches of different racks. A rack can include switch 152 coupled to servers 154-0 to 154-N. Another rack can include switch 156 coupled to servers 158-0 to 158-N. One or more of the switches can operate in accordance with embodiments described herein. A core switch or other access point can connect aggregation switch 150 to the Internet for packet transmission and receipt with another data center.

Note that depiction of servers relative to switch is not intended to show a physical arrangement as a TOR, MOR or any other switch position can be used (e.g., end of rack (EOR)) relative to servers.

Embodiments described herein are not limited to data center operation and can apply to operations among multiple data centers, enterprise networks, on-premises, or hybrid data centers.

As network processing can be moved to a switch, any type of configuration that requires power cycling (e.g., after NVM update or firmware update (e.g., update of a Basic Input/Output System (BIOS), Universal Extensible Firmware Interface (UEFI), or a boot loader)) can be performed in isolation and not require the entire switch to power cycle to avoid impacting all servers connected to the switch and in the rack.

Dual Control Plane

Figure 2A:
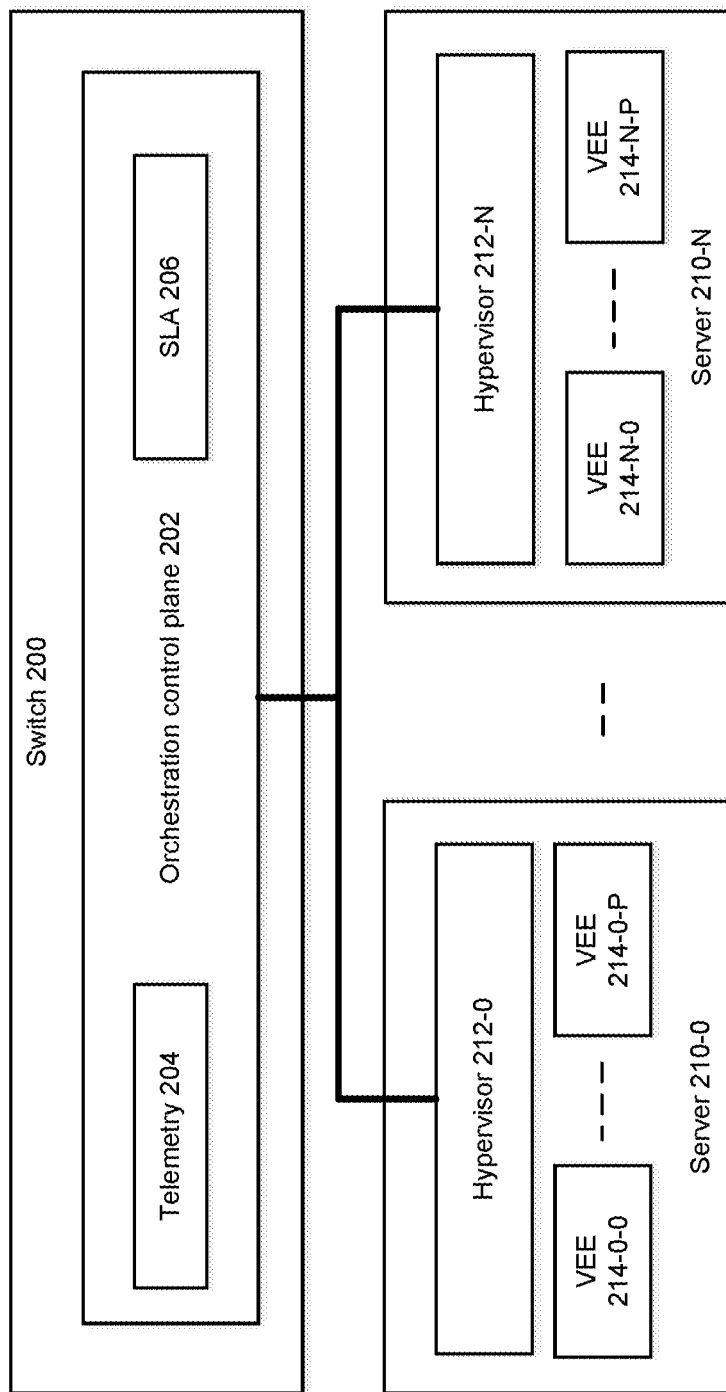
FIG. 2A depicts an example overview of a system of managing resources in a rack.

FIG. 2A depicts an example overview of a system of managing resources in a rack. Various embodiments provide switch 200 with orchestration control plane 202 that can manage control planes in one or more servers 210-0 to 210-N connected to switch 200. Orchestration control plane 202 can receive SLA information 206 for one or more VEEs (e.g., any of 214-0-0 to 214-0-P or 214-N-0 to 214-N-P), telemetry information 204 from servers in the rack such as resource utilization, measured device throughput (e.g., memory read or write completion times), available memory or storage bandwidth, or resources needs of a server connected to the switch or more broadly, in the rack. Using telemetry information 204 to affect compliance with SLAs of VEEs, orchestration control plane 202 can proactively control, moderate, or quiesce network bandwidth allocated to a server (e.g., data transmission rates from switch 200 to a server or from the server to switch 200) and thereby moderate a rate of communications sent from or received by VEEs running on a server.

In some examples, orchestration control plane 202 can allocate to any server's hypervisor (e.g., 212-0 to 212-N) one or more of: compute resources, network bandwidth (e.g., between switch 200 and another switch (e.g., aggregation switch or switch for another rack), and memory or storage bandwidth. For example, switch 200 can proactively manage data transmission or receipt bandwidths to any VEE in a rack and prior to receipt of any flow control message, but can also manage data transmission bandwidth from any VEE in the event of receipt of a flow control message (e.g., XON/XOFF or Ethernet PAUSE) to reduce or pause transmission of a flow. Orchestration control plane 202 can monitor activities of all servers 210-0 to 210-N in its rack at least based on telemetry data and can manage hypervisors 212-0 to 212-N to control traffic generation of VEEs. For example, switch 200 can perform flow control to quiesce a packet transmitter from either a local VEE or a remote sender in cases where congestion is detected. In other cases, hypervisors 212-0 to 212-N can compete for resources from orchestration control plane 202 to allocate for managed VEEs, but such a scheme may not lead to under allocation of resources to some VEEs.

For example, to allocate or moderate resources, orchestration control plane 202 can configure a hypervisor (e.g., 212-0 or 212-N) associated with a server that executes one or more VEEs. For example, servers 210-0 to 210-N can execute respective hypervisor control plane 212-0 to 212-N to manage data planes for VEEs running on a server. For a server, a hypervisor control plane (e.g., 212-0 to 212-N) can track SLA requirements for VEEs running on its server and manage those requirements within the allocated compute resources, network bandwidth, and memory or storage bandwidth. Similarly, a VEE can manage the contention between flows within the resource that it is granted.

Orchestration control plane 202 can be afforded privileges within switch 200 and servers 210-0 to 210-N at least to configure resource allocations to servers. Orchestration control plane 202 can be insulated from untrusted VEEs that may compromise a server. Orchestration control plane 202 can monitor and shutdown a VEE's VF or a server's PF for a NIC if malicious activity is detected.

An example of tiered configurability by orchestration control plane 202 of a hypervisor control plane 212 is described next. A hypervisor control plane 212 (e.g., any of hypervisor control plane 212-0 to 212-N) for a server can determine whether to configure resources afforded to a VEE and operations of the VEE in response to a physical host configuration request having been received, such as from orchestration control plane 202, an administrator, as a result of an update to a policy associated with a tenant for which the VEE executes, etc.

A configuration from orchestration control plane 202 can be classified as trusted or untrusted. Hypervisor control plane 212 for a server can allow any trusted configuration to be enacted for a VEE. In some examples, bandwidth allocation, initiation of VEE migration or termination, and resource allocations made by orchestration control plane 202 can be classified as trusted. Hypervisor 212 can limit untrusted configurations to perform certain configurations, but not certain hardware access/configuration operations that exceed a trust level. For example, an untrusted configuration cannot issue device resets, change the link configuration, write sensitive/device wide registers, and update the device firmware, etc. By separating configurations into trusted or untrusted, hypervisor 212 can neutralize a potential attack surface by sanitizing untrusted requests. In addition, hypervisor 212 can expose different capabilities for each of its different VEEs, thus allowing the host/provider to segregate tenants as needed.

Figure 2B:
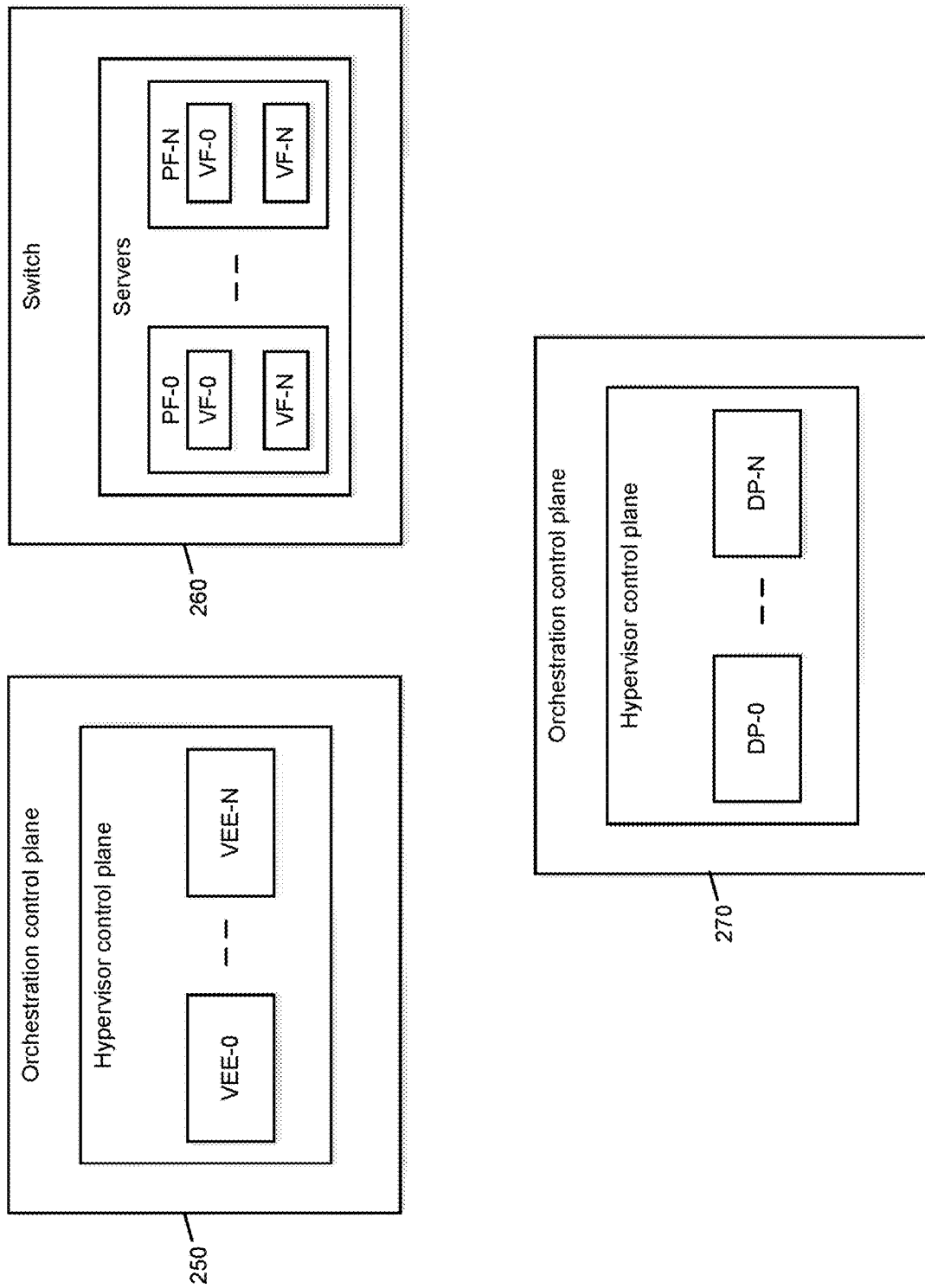
FIG. 2B depicts an example overview of various management hierarchies.

FIG. 2B depicts an example overview of various management hierarchies. In representation 250, as described earlier, orchestration control plane issues trusted configurations to hypervisor control plane of a server. Some or all commands or configurations from orchestration control plane sent to hypervisor control plane can be considered trusted. Hypervisor control plane institutes the configurations for VEEs managed by the hypervisor.

In representation 260, the switch controls servers as though the servers represent physical functions (PFs) and associated virtual functions (VF-0 to VF-N) represent VEEs. In cases where SR-IOV is used, a bare metal server (e.g., single tenant server) or OS hypervisor corresponds to a PF and VEEs access the PF using their corresponding VF.

In representation 270, the orchestration control plane manages a hypervisor control plane. Indirectly, orchestration control plane can manage data planes DP-0 to DP-N of a server to control allocated resources, allocated network bandwidth (e.g., transmit or receive), and migration or termination of any VEE.

Memory Transactions

Figure 3:
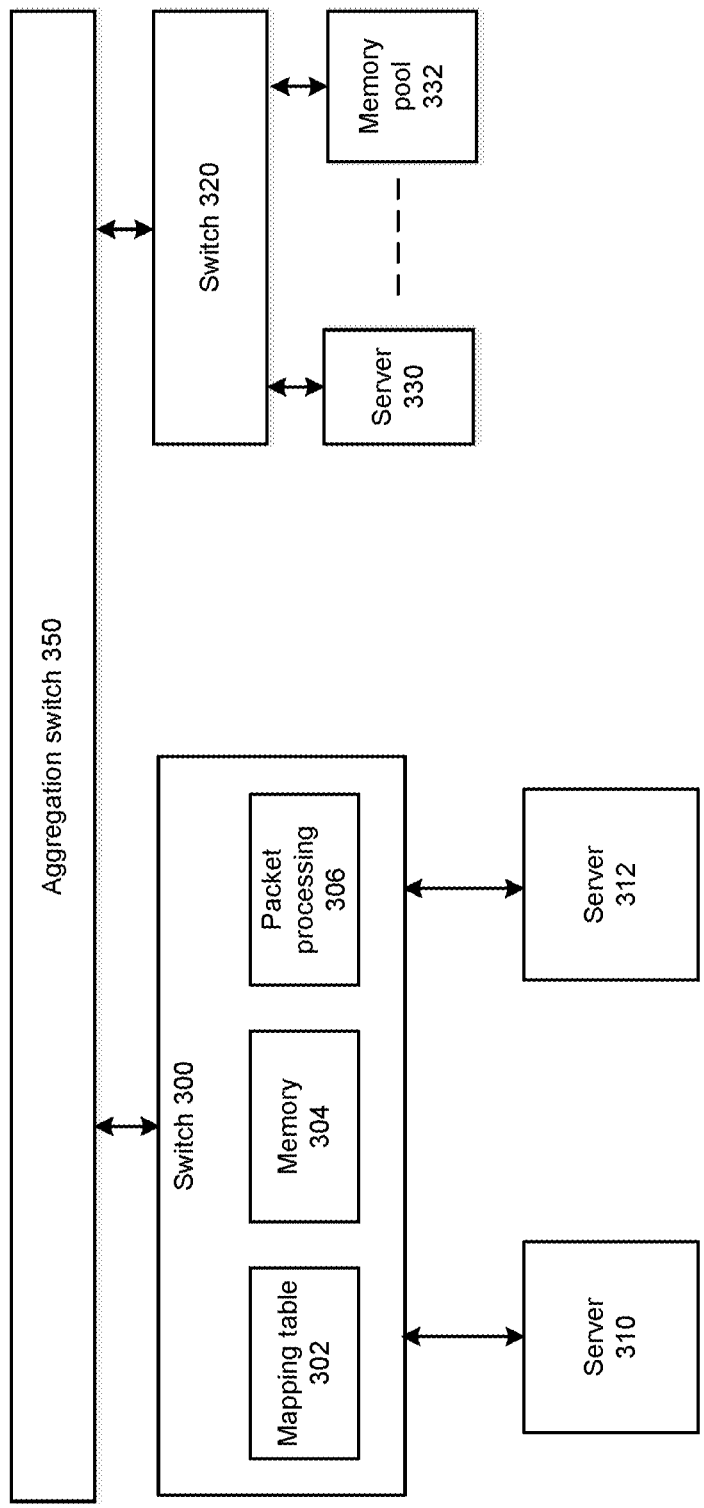
FIG. 3 depicts an example system in which a switch can respond to a memory access request.

FIG. 3 depicts an example system in which a switch can respond to a memory access request. A requester device or VEE in or executing on server 310 can request data stored in server 312. Switch 300 can receive and process the memory access request and determine a destination server or device (e.g., IP address or MAC address) to which the memory access request is to be provided for completion (e.g., read or write) is memory pool 332. Instead of providing the memory access request to server 312, which will transmit the request to memory pool 332, switch 300 can transfer the request to memory pool 332.

In some examples, switch 300 can access mapping table 302 that indicates a mapping of a memory address associated with a memory access request to a device physical address (e.g., destination IP address or MAC address). In some examples, switch 300 can be trusted with addresses of target devices and conversion of virtual addresses (provided with the memory access request) to physical address. In some examples, switch 300 can request a memory access (e.g., read or write) on behalf of a requester of the memory access at the target device.

In some examples, switch 300 can directly access memory pool 332 to retrieve data for a read operation or write data. For example, when server 310 requests data from server 312 but the data is stored in memory pool 332, switch 300 may retrieve the requested data from memory pool 332 (or other server) and provide the data to server 310 and potentially store the data in memory 304 or server 312. Switch 300 can fetch the data from memory pool 332 (or other device, server, or storage pool) by issuing a data read request to switch 320 to retrieve the data. Memory pool 332 can be located within a same data center as switch 300 or outside of the data center. Switch 300 can store the fetched data in memory 304 (or server 312) to allow multiple read-write transactions with low latency by servers in a same rack as switch 300. A highspeed connection can provide data from memory 304 to server 310 or vice versa. In cases that CXL.mem is used to transfer data from server 310 to memory 304 or vice versa, applicable protocol rules can be followed. Switch 300 can update the data in memory pool 332 if the data from memory 304 is modified.

Accordingly, a two-level memory (2LM) architecture can be implemented to copy data to a local memory accessible over a fast connection for processing by VEEs and significantly alleviating the latency penalty associated with retrieving data.

In cases where the memory access request is a read request and data is stored by a server or device connected to another switch (e.g., switch 320) and in another rack, switch 300 can forward the request to the target device that stores the data to respond to the memory request. For example, switch 300 can use packet processing 306 to change a destination IP or MAC address of the packet that conveyed the memory access request to be that of the target device or encapsulate the request in another packet but maintain the destination IP or MAC address of the received memory access request.

Thin memory provisioning allows less memory on a compute node and building a memory pool that is shared by multiple compute nodes. The shared memory can be dynamically allocated/deallocated to compute nodes with allocation set at page or cache line granularity. In aggregate, memory allocated on all compute nodes and memory in shared pool can be less than amount of memory allocated to a compute node. For example, where thin memory provisioning is used for server 310, data can be stored in a memory on a same rack as that of server 310 and potentially in a remote memory pool 332.

For a memory access request from server 310 that is a write operation, if a target device is not on a rack of switch 300, switch 300 can queue the write, report the write operation as complete to server 310 (e.g., the VEE) and then update memory pool 332 as memory bandwidth allows or as required by memory ordering and cache coherency requires (e.g., flushing posted writes).

In some examples, switch 300 can process a memory access to a region of a memory with a corresponding address and, in the case of a write, corresponding data to write. Switch 300 can read data from or store data to memory pool 332 using remote direct memory access (e.g., InfiniBand, iWARP, RoCE and RoCE v2), NVMe over Fabrics (NVMe-oF) or NVMe. For example, NVMe-oF is described at least in NVM Express Base Specification Revision 1.4 (2019), as well as predecessors, successors, and proprietary variations thereof. NVMe is described for example, in NVM Express™ Base Specification, Revision 1.3c (2018), as well as predecessors, successors, and proprietary variations thereof. In cases where the data is stored by a server or device (e.g., memory pool 332) connected to another switch (e.g., switch 320), switch 300 can retrieve data or write data as though the data were stored in a server of a same rack as server 310.

In addition to the cache or memory space on each server, switch 300 may also contribute to the aggregated cache space as well. Smart cache allocation could place data in a memory of a server that accesses the data. Data that is thrashed (e.g., accessed and modified by several servers) could be placed in memory 304 of switch 300 or server 312 where it could be accessed with the fewest connection or Ethernet link traversals.

Memcached Example

Memcached can provide a distributed memory-caching system within a data center or across multiple data centers. For example, Memcached can provide distributed databases to speed up applications by alleviating database load. In some examples, dedicated servers can be used as Memcached servers to consolidate resources across servers (e.g., via Ethernet) and cache commonly accessed data to speed up access to that data. In various embodiments, a switch can manage data stored as part of a Memcached object, data, or string storage in at least some memory resources in servers connected to the switch.

Figure 4A:
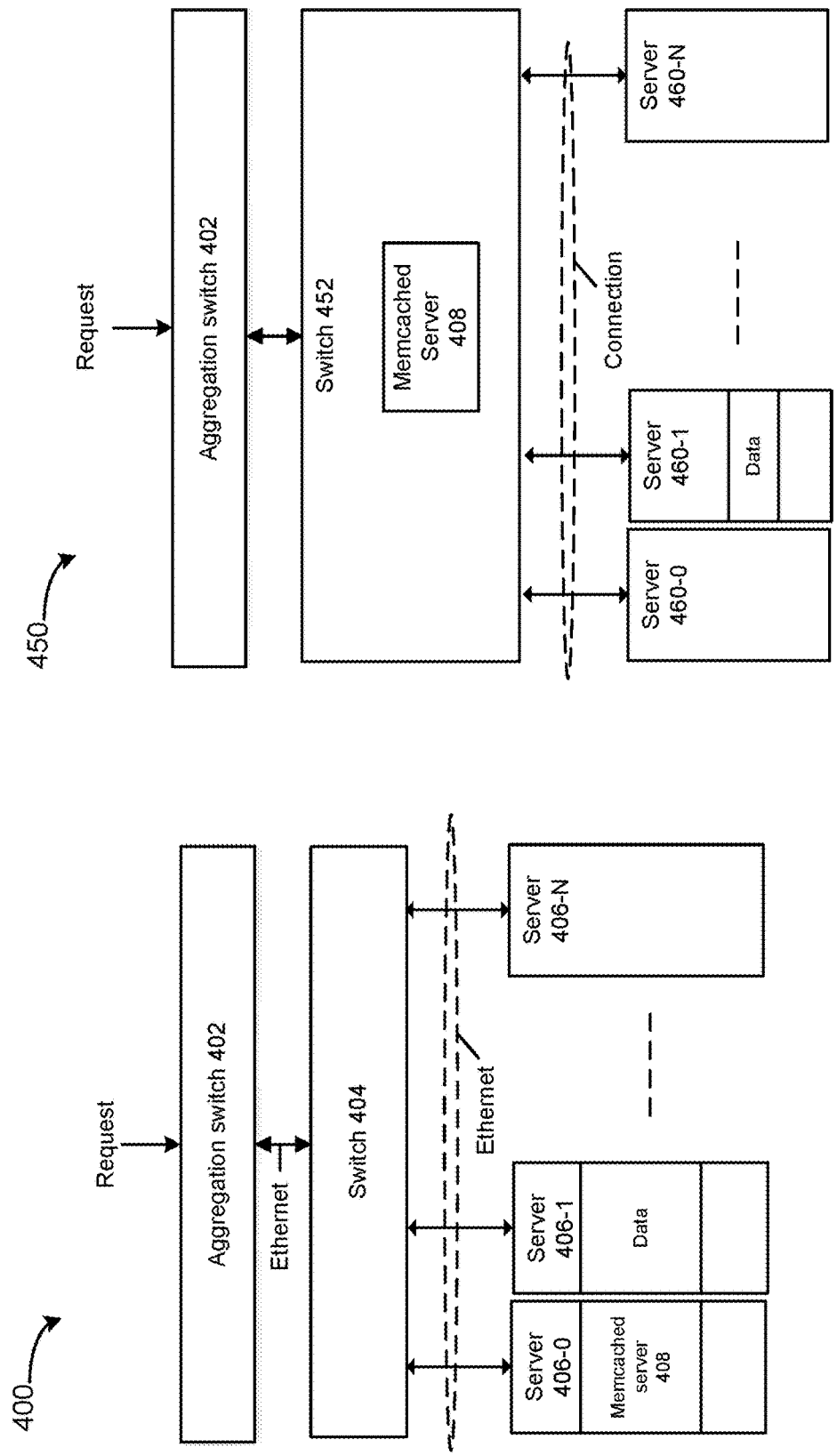
FIG. 4A shows examples of a Memcached server executing on a server and in a switch.

FIG. 4A shows examples of a Memcached server executing on a server (system 400) and in a switch (system 450). Use of Memcached allows frequently requested data to be provide faster by use of a hash look up instead or a database (or any other complex) query, although a database query can be used in any embodiment. A first request for data can be relatively slow as it causes retrieval of data. Future requests for the same data can be faster as the data is stored and can be provided from the data server. In system 400, a requestor can be a client/server on a different rack in a row of the data center, on a different row in the data center, or an external request from outside of the data center. The request can be received at aggregation switch 402 and provided to switch 404 using an Ethernet link. Switch 404, in turn, can use an Ethernet link to provide the request to Memcached server 408 running on server 406-0, which in turn provides a request for data to server 406-1. Despite a data server 406-1 being in the same rack as the Memcached server 406-0, there are multiple Ethernet communications within the same rack to provide the desired data. Ethernet communications can contribute to east-west traffic within a datacenter.

In system 450, the request can be received at aggregation switch 402 and provided to switch 452 using an Ethernet link. Switch 452 executes Memcached server 408 using one or more processors and determines a server device that stores requested data. In cases where data is stored in a same rack for which switch 452 provides connectivity (e.g., using PCIe, CXL, DDRx), the request can be provided to server 460-1 and not contribute to east-west traffic. If the requestor were in the same rack (e.g., server 460-N), as switch 454 is a network endpoint, the request could be handled internally to switch 454 and not travel over Ethernet to be fulfilled. In cases of a cache miss (e.g., data is not stored in server 460-1, in some scenarios, data can be retrieved from another server (e.g., 460-0) over the connection.

For example, switch 452 can execute Memcached in a VEE running on the switch and can consolidate resources in the entire rack into a virtual pool of combined cache and memory via a high-speed connection.

Additionally, with switch 452 handling NIC endpoint operations, all requests could automatically route through Memcached server 408 running in a VEE executing on switch 452 and the client requester no longer needs to maintain a list of Memcached servers. A Memcached server VEE could automatically update its cache (e.g., shown as data in server 460-1) based on how it is configured to improve data locality to requesters and reduce further latency.

Figure 4B:
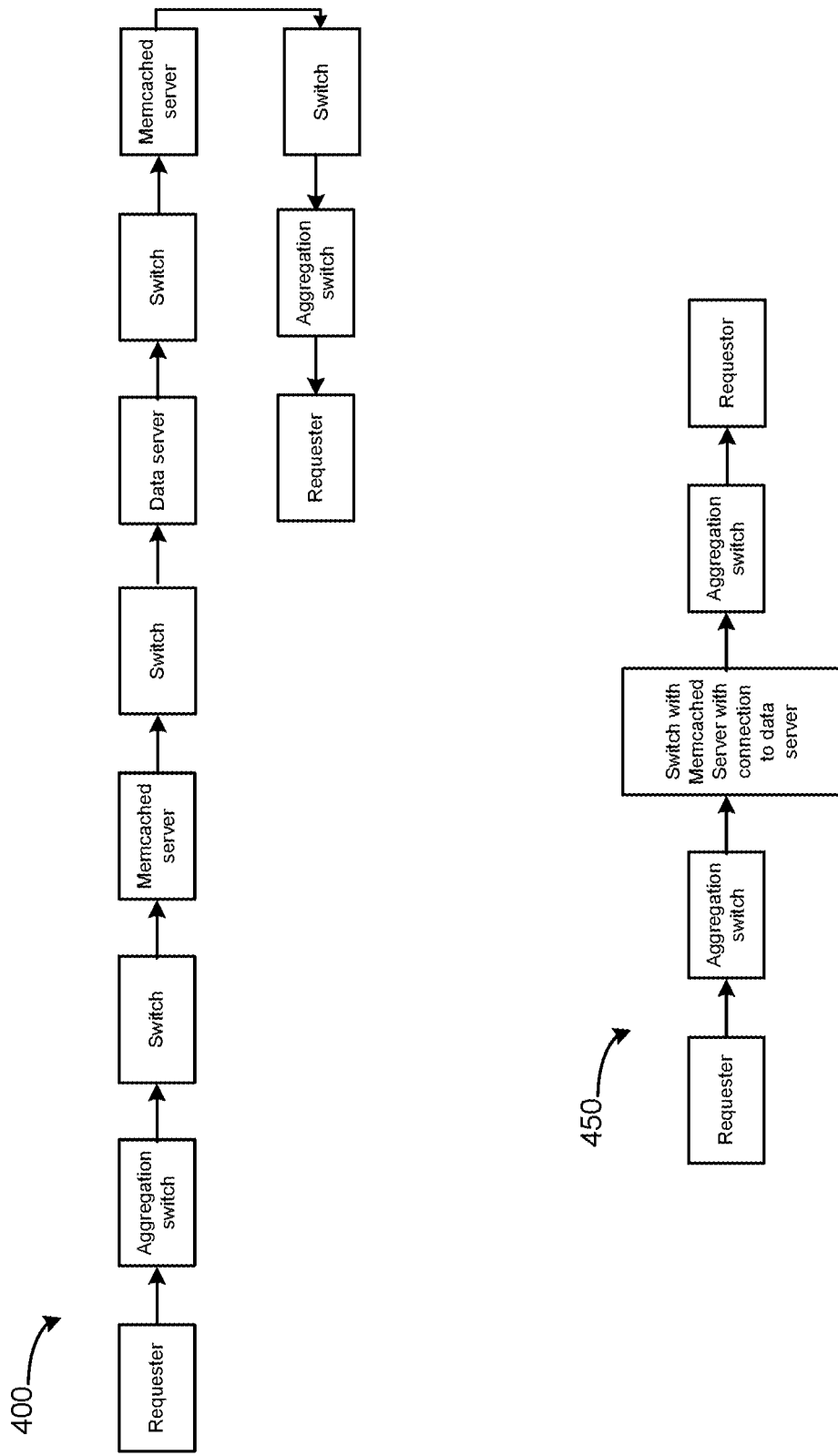
FIG. 4B shows the Ethernet packet flow for a single request.

FIG. 4B shows the Ethernet packet flow for a single request. Each arrow represents a traversal of an Ethernet link and contribution to east-west or north-south traffic. For system 400, in the case of a cache miss, whereby data is not available at the data server, a total of 10 Ethernet link (or other format) traversals are made. A requester sends a request to an aggregation switch, the aggregation switch provides the request to a switch and in turn, the switch provide the request to the Memcached server. The Memcached server provides a request to be sent to a data server through the switch. The data server responds by indicating that data is not present via the switch to the Memcached server. The Memcached server receives a response of a cache miss so that the Memcached server can update its cache with the data so subsequent requests for that data no longer result in a cache miss. The Memcached server provides the data to the requester even in cases of a cache miss.

Where the Memcached server is in a different rack in the data center than a rack that stores the data, for the request to be fulfilled, the request travels to a different rack and a response is provided to the Memcached server. However, the switch could issue an Ethernet request to a rack that stores the data. In some examples, the switch could bypass the Memcached servers and request data from the data source directly.

For system 450, a requester provides a request to the switch via an aggregation switch and the switch accesses the Memcached server and data in its rack via a connection (e.g., PCIe, CXL, DDRx) and provides the response data to the requester via an aggregation switch to the requester. In this example, 4 Ethernet link traversals occur. Providing a Memcached service in a switch can reduce the network accesses to databases on other racks and even reduce the east-west traffic within the rack by performing the Memcached data location look-up in the switch. In some cases, where data is cached in a memory of the switch (e.g., in memory 304) or in a server of the rack, the switch can directly supply the requested data in response to the request. In cases of cache misses, fewer Ethernet communications are made by system 450 because servers in the same rack are accessible via switch 452 (FIG. 4A) using high-speed connections (PCIe, CXL, DDR, etc.) to retrieve data to cache.

Network Termination at a Switch

Figure 5A:
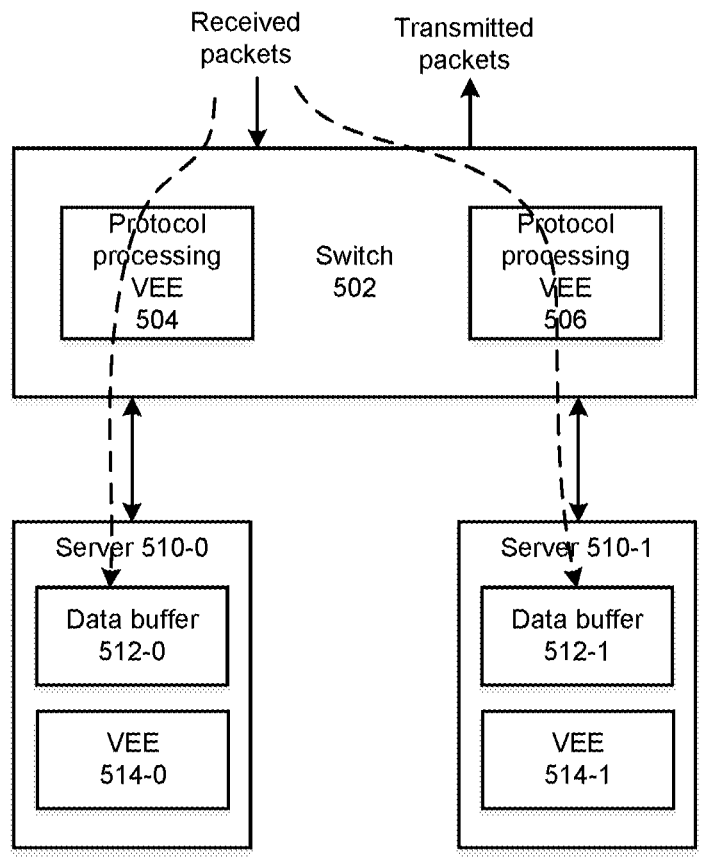
FIGS. 5A-5C depict example systems in which packets can terminate at a switch.

FIG. 5A depicts an example system in which packets can terminate at a switch. A packet can be received by switch 502 from an aggregation switch, for example. The packet can be Ethernet compatible and use any type of transport layer (e.g., Transmission Control Protocol (TCP), Data Center TCP (DCTCP), User Datagram Protocol (UDP), quick User Datagram Protocol Internet Connections (QUIC)). Various embodiments of switch 502 can execute one or more VEEs (e.g., 504 or 506) to terminate a packet by performing network protocol activity. For example, VEEs 504 or 506 can perform network protocol processing or network termination on switch 502 such as one or more of: segmentation, reassembly, acknowledgements (ACKs), negative-acknowledgements (NACKs), packet retransmit identification and requests, congestion management (e.g., flow control of a transmitter), Secure Sockets Layer (SSL) or Transport Layer Security (TLS) termination for HTTP and TCP. As memory pages are filled (such as at the socket layer), pages can be copied to a destination server on the rack using a high speed connection and corresponding protocol (e.g., CXL.mem) for access by the bare metal host or a VEE. In some examples, protocol processing VEE 504 or 506 can perform network service chain features such as firewalls, network address translation (NAT), intrusion protection, decryption, evolved packet core (EPC), encryption, filtering of packets based on virtual local area network (VLAN) tag, encapsulation, and so forth.

For example, switch 502 can execute protocol processing VEEs 504 and 506 when there is low utilization of switch's processors. In addition, or alternatively, a protocol processing VEE could execute on the computing resources of one or more servers in a rack. Switch 502 can include or access via high-speed connections packet buffers for receipt or transmission of packets.

In some examples, VEEs 504 or 506 can perform packet protocol termination or network termination of at least some received packets at switch 502. For example, VEEs 504 or 506 can perform packet processing for any of layers 2-4 of the Open Systems Interconnection model (OSI model) (e.g., Data link layer, Network layer, or Transport layer (e.g., TCP, UDP, QUIC)). In addition, or alternatively, VEEs 504 or 506 can perform packet processing for any of layers 5-7 of the OSI model (e.g., Session layer, Presentation layer, or Application layer).

In some examples, VEEs 504 or 506 can provide a tunnel endpoint by performing tunnel origination or termination by providing encapsulation or decapsulation for technologies such as, but not limited to, Virtual Extensible LAN (VXLAN) or Network Virtualization using Generic Routing Encapsulation (NVGRE).

In some examples, VEEs 504 or 506 or any device (e.g., programmable or fixed function) in switch 502 can perform one or more of: large receive offload (LRO), large send/segmentation offload (LSO), TCP segmentation offload (TSO), Transport Layer Security (TLS) offload, receive side scaling (RSS) to allocate a queue or core to process a payload, dedicated queue allocation, or another layer protocol processing.

LRO can refer to switch 502 (e.g., VEEs 504 or 506 or a fixed or programmable device) reassembling incoming network packets and transferring packet contents (e.g., payloads) into larger contents and transferring the resulting larger contents but fewer packets for access by the host system or a VEE. LSO can refer to switch 502 (e.g., VEEs 504 or 506) or server 510-0 or 510-1 (e.g., VEE 514-0 or 514-1) generating a multipacket buffer and providing content of the buffer to switch 502 (e.g., VEEs 504 or 506 or a fixed or programmable device) to split into separate packets for transmission. TSO can permit switch 502 or a server 510-0 or 510-1 to build a larger TCP message (or other transport layer) (e.g., 64 KB in length) and switch 502 (e.g., VEEs 504 or 506 or a fixed or programmable device) segmenting the message it into smaller data packets for transmission.

TLS is defined at least in The Transport Layer Security (TLS) Protocol Version 1.3, RFC 8446 (August 2018). TLS offload can refer to offload of encryption or decryption of contents in accordance with TLS to switch 502 (e.g., VEEs 504 or 506 or a fixed or programmable device). Switch 502 can receive data for encryption from server 510-0 or 510-1 (e.g., VEE 514-0 or 514-1) or VEEs 504 or 506, and perform the encryption of data prior to transmission of encrypted data in one or more packets. Switch 502 can receive packets and decrypt content of packets prior to transfer of decrypted data to server 510-0 or 510-1 for access by VEE 514-0 or 514-1 or VEEs 504 or 506. In some examples, any type of encryption or decryption be performed by switch 502 such as but not limited to Secure Sockets Layer (SSL).

RSS can refer to switch 502 (e.g., VEEs 504 or 506 or a fixed or programmable device) calculating a hash or make another determination based on contents of a received packet to determine and select which CPU or core is to process payload from the received packet. Other manners of distributing payloads to cores can performed. In some examples, switch 502 (e.g., VEEs 504 or 506 or a fixed or programmable device) can perform RSS to select a nonuniform memory access (NUMA) node with core and memory pairings to identify a NUMA node that is to store and process payload from the received packet. In some examples, switch 502 (e.g., VEEs 504 or 506 or a fixed or programmable device) can perform RSS to select a core on switch 502 or a server that is to store and process payload from the received packet. In some examples, switch 502 can perform RSS to allocate one or more cores (on switch 502 or a server) to perform packet processing.

In some examples, switch 502 can allocate a dedicated queue in a memory to an application or VEE according to Application Device Queue (ADQ) or similar technology. Use of ADQ can dedicate queues to applications or VEEs, and these queues can be exclusively accessed by the applications or VEEs. ADQ can prevent network traffic contention whereby different applications or VEEs attempt to access the same queue and cause locking or contention, and the performance (e.g., latency) of packet availability becomes unpredictable. Moreover, ADQ provides quality of service (QOS) control for dedicated application traffic queues for received packets or packets to be transmitted. For example, using ADQ, switch 502 can allocate packet payload content to one or more queues where the one or more queues are mapped to access by software such as an application or VEE. In some examples, switch 502 can utilize ADQ to dedicate one or more queues for packet header processing operations.

Figure 5B:
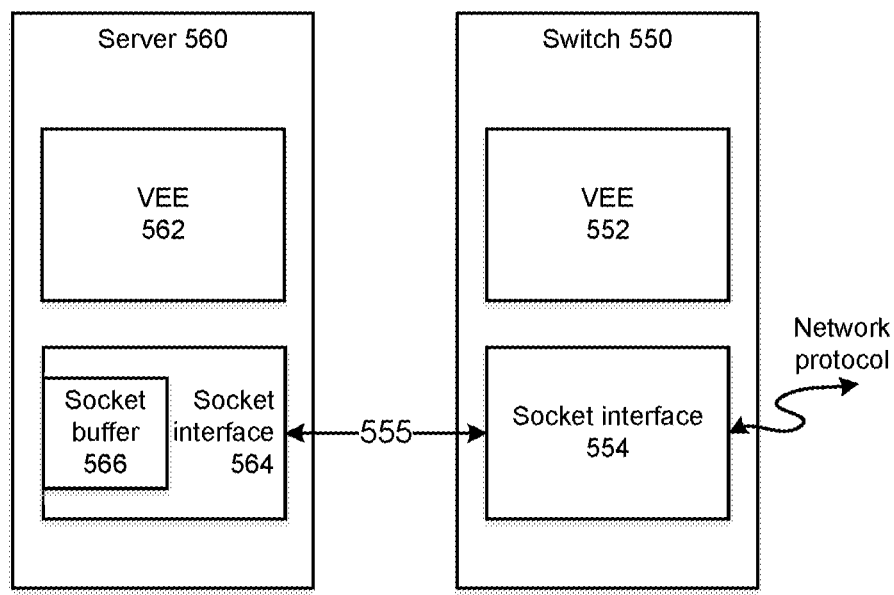
Figure 5C:
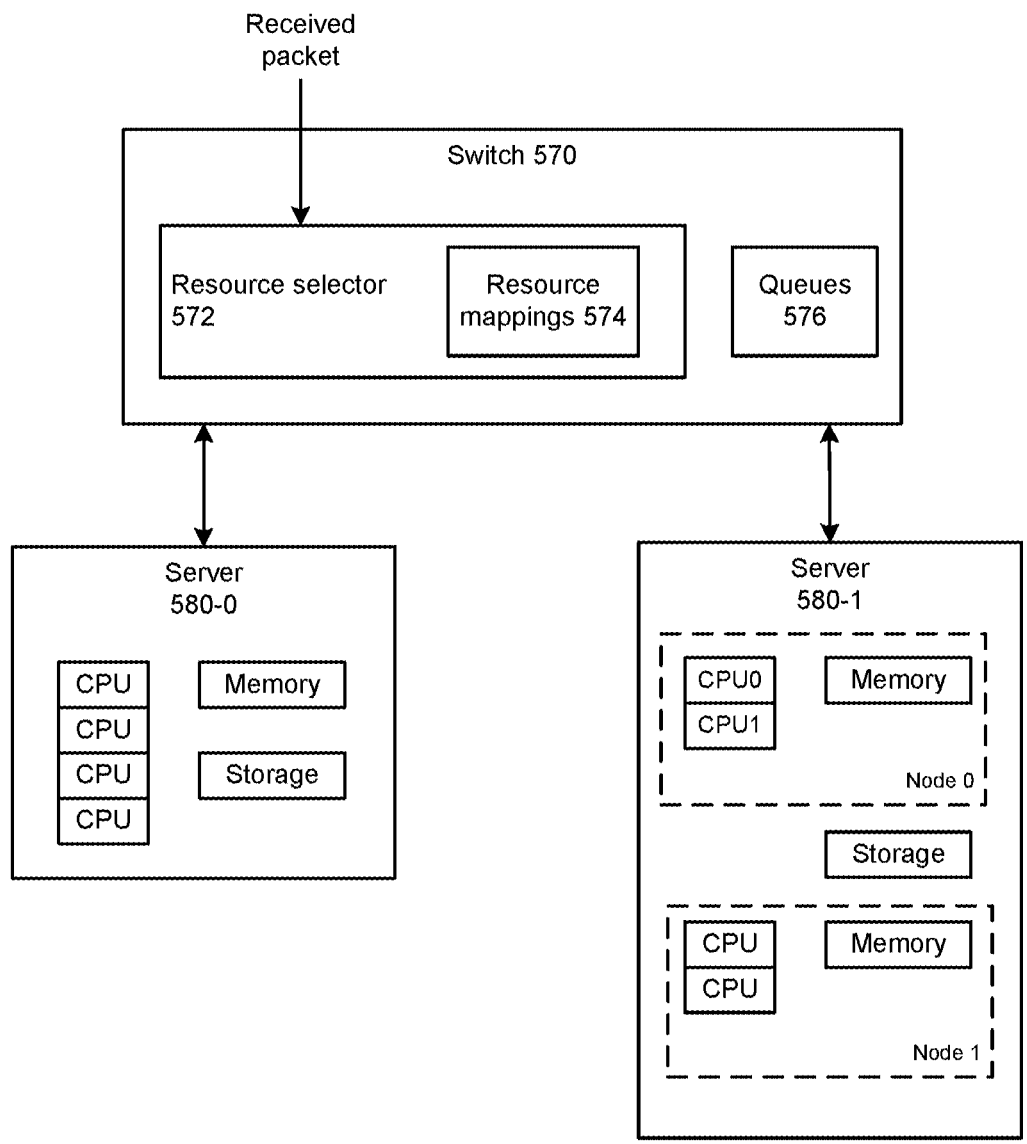

FIG. 5C depicts an example manner of NUMA node, CPU or server selection by switch 502 (e.g., VEEs 504 or 506 or a fixed or programmable device). For example, resource selector 572 can perform a hash calculation on a received packet's header (e.g., hash calculation on a packet flow identifier) to determine an indirection table stored on switch 502 that maps to a queue (e.g., among queues 576), which in turn maps to a NUMA node, CPU or server. Resource mappings 574 can include an indirection table and mapping to queue as well as indicator of which connection (e.g., CXL link, PCIe connection or DDR interface) to use to copy a header and/or payload of a received packet to a memory (or cache) associated with a selected NUMA node, CPU or server. In some cases, resource selector 572 performs RSS to select a NUMA node, CPU or server. For example, resource selector 572 can select a CPUI in NUMA Node 0 on server 580-1 to process the header and/or payload of the received packet. A NUMA node on a server could have its own connection to switch 570 to allow writing to memory in a server without traversing a UPI bus. A VEE can be executed on one or more cores or CPUs and the VEE can process the received payload.

Referring again to FIG. 5A, to perform packet protocol processing, VEEs 504 or 506 can execute processes based on Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

In some examples, any protocol processing, protocol termination, network termination, or offload operation can be performed by a programmable or fixed function device in switch 502 instead of or in addition to use of a VEE executing in switch 502.

In some examples, processing packets in switch 502 can allow for a faster decision of packet handling (e.g., forward or discard) than were a decision of packet handling were made in a server. In addition, bandwidth utilization of a connection between a server and switch can be saved from use in the event of packet discard. If a packet were identified as related to malicious activity (e.g., DDOS attack), the packet could be discarded and insulate a server from potential exposure to the malicious activity.

VEEs 504 and 506 running on compute resources of switch 502 can complete network processing and provide resulting data is transferred to a data buffer for a VEE 514-0 or 514-1 via DMA, RDMA, PCIe, CXL.mem, regardless of the network protocol that was used to deliver the packet. In other words, VEEs 504 and 506 running on the compute resources of switch 502 can act as proxy VEEs for respective VEEs 514-0 or 514-1 running on respective servers 510-0 and 510-1. For example, VEE 504 or 506 can perform protocol stack processing. A VEE executing on switch 502 (e.g., VEE 504 or 506) can provide a socket buffer entry to host and data in a buffer (e.g., 512-0 or 512-1).

Based at least on successful protocol layer processing and absence of any deny condition in an ACL, a payload from the packet can be copied into memory buffer (e.g., 512-0 or 512-1) in a destination server (e.g., 510-0 or 510-1). For example, VEEs 504 and 506 can cause performance of a direct memory access (DMA) or RDMA operation to copy the packet payload to a buffer associated with a VEE (e.g., VEEs 514-0 and 514-1) that is to process the packet payload. A descriptor can be a data structure provided by an orchestrator or VEEs 514-0 and 514-1 to switch 500 to identify available regions of memory or cache to receive packets. In some examples, VEEs 504 and 506 can complete receive descriptors to indicate destination locations of packet payloads in a buffer of a destination server (e.g., 510-0 or 510-1) and copy the completed receive descriptors for access by the VEE that is to process the packet payload.

In some examples, switch 502 can execute VEEs for each of VEEs executing on servers within its rack or an optimized subset. In some examples, a subset of VEEs to execute on the switch can correspond to VEEs running on servers with low latency requirements, are primarily network focused, or other criteria.

In some examples, switch 502 is connected to servers 510-0 and 510-1 using connections that permit switch 502 to access to all the CPUs, memory, storage in the rack. An orchestration layer can manage resource allocation to VEEs in some or all of switch 502 and any server in the rack.

VEEs 514-0 and 514-1 executed in respective servers 510-0 and 510-1 can select a mode of being informed of data availability such as: polling mode, busy poll, or interrupt. Polling mode can include a VEE polling for a new packet by actively sampling a status of a buffer to determine if there is a new packet arrival. Busy polling can allow socket layer code to poll a receive queue and disable network interrupts. Interrupt can cause an executing process to save its date and perform a process associated with an interrupt (e.g., process a packet or data).

Server 510-0 or 510-1 in a rack can receive interrupts instead of running in polling mode for packet processing.

Interrupts can be issued by switch 502 to a server for higher level transactions, rather than per packet. For example, where a VEE 514-0 or 514-1 runs a database, an interrupt could be provided by VEE 504 or 506 to VEE 514-0 or 514-1 when a record update is complete even if a record update is provided using many packets. For example, where a VEE 514-0 or 514-1 runs a webserver, an interrupt could be provided by VEE 504 or 506 to VEE 514-0 or 514-1 after a complete form is received, despite one or multiple packets providing the form. Polling for received packets or data could be used in any case.

FIG. 5B depicts an example of a composition of VEEs on a server and switch. In this example, VEE 552 executes on switch 550 to perform protocol processing or packet protocol termination for packets having payloads to be processed by VEE 562, which executes on server 550. VEE 552 can execute on one or more cores on switch 550. For example, VEE 552 can process packet headers for packets utilizing TCP/IP or other protocol or protocol combinations. VEE 552 can write a payload of a processed packet to a socket buffer 566 in server 560 via socket interface 554-to-socket interface 564 and high speed connection 555 (e.g., PCIe, CXL, DDRx (where x is an integer)). Socket buffer 566 can be represented as a memory address. An application (e.g., running in VEE 562 executing server 560 can access the socket buffer 566 to utilize or process the data. VEE 552 can provide operations of a TCP Offload Engine (TOE) without requiring any of the protocol stack changes (such as TCP Chimney).

In some examples, network termination occurs in VEE 552 of switch 550 and server 560 does not receive any packet headers in socket buffer 566. For example, VEE 552 of switch 550 can perform protocol processing of Ethernet, IP, and transport layers (e.g., TCP, UDP, QUIC) headers and such header would not be provided to server 560.

Some applications have their own headers or markers, and switch 550 can transfer or copy those headers or markers, in addition to the payload data, to socket buffer 566. Accordingly VEE 562 can access data in socket buffer 566 regardless of the protocols used to transmit the data (e.g., Ethernet, asynchronous transfer mode (ATM), Synchronous optical networking (SONET), synchronous digital hierarchy (SDH), Token Ring, and so forth.

In some examples, VEEs 552 and 562 can be related as a network service chaining (NSC) or service function chaining (SFC) whereby VEE 552 hands data off to VEE 562 within a trusted environment or at least by sharing of memory space. Network service VEE 552 can be chained to an application service VEE 562 and VEEs 552 and 562 could have a shared memory buffer for layer 7 data passing.

Telemetry Aggregation

In data centers, device (e.g., compute or memory) utilization and performance and software performance can be measured to evaluate server usage and whether adjustments are to be made or not made to available resources or software. Examples of telemetry data include device temperature readings, application monitoring, network usage, disk space usage, memory consumption, CPU utilization, fan speeds, as well as application-specific telemetry streams from VEEs running on a server. For example, telemetry data can include counters or performance monitoring events related to: processor or core usage statistics, input/output statistics for devices and partitions, memory usage information, storage usage information, bus or interconnect usage information, processor hardware registers that count hardware events such as instructions executed, cache-misses suffered, branches mis predicted. For a workload request that is being performing or has completed, one or more of the following can be collected: telemetry data such as but not limited to outputs from Top-down Micro-Architecture Method (TMAM), execution of the Unix system activity reporter (SAR) command, Emon command monitoring tool that can profile application and system performance. However, additional information can be collected such as outputs from a variety of monitoring tools including but not limited to output from use of the Linux perf command, Intel PMU toolkit, Iostat, VTune Amplifier, or monCli or other Intel Benchmark Install and Test Tool (Intel® BITT) Tools. Other telemetry data can be monitored such as, but not limited to, power usage, inter-process communications, and so forth. Various telemetry techniques such as those described with respect to the collected daemon can be used.

As VEEs in a datacenter transmit telemetry data to a central orchestrator, the bandwidth requirements could be enormous and east-west traffic could be overwhelmed by telemetry data. In some cases, key performance indicators (KPIs) are provided by a server and if one of these KPIs indicates a problem, a server sends a more robust set of telemetry to allow more detailed investigation.

In some embodiments, when a high-speed connection is used between a server and switch, much more information can pass from the server to the switch without burdening east-west traffic. The switch can collect more than a minimum set of telemetry (e.g., KPIs) from the server while not burdening the network with excessive east-west traffic overhead. However, in some examples, a server can send KPIs to the switch unless more data or history is requested such as in the case of an error. An orchestrator (e.g., orchestration control plane 202 of FIG. 2A) executed for the switch can use expanded telemetry data (e.g., telemetry 204 of FIG. 2A) to determine available capacity on each of the servers on its rack and can provide refined multi-server job placements to maximize performance considering telemetry of multiple servers.

VEE Execution and Migration

Figure 6:
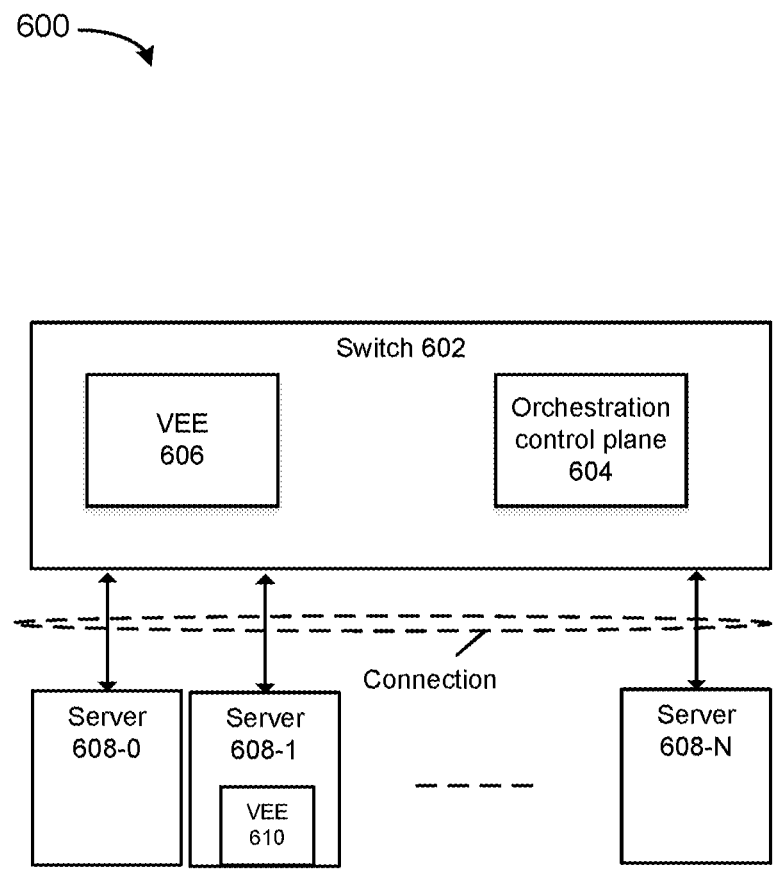
FIG. 6 depicts an example of a switch that executes an orchestration control plane to manage what device executes a virtualized execution environment.

FIG. 6 depicts an example of a switch that executes an orchestration control plane to manage what device executes a VEE. Orchestration control plane 604 executing on switch 602 can monitor one or more VEE's performance in terms of compliance with an applicable SLA and when the VEE does not comply with an SLA requirement (e.g., application availability (e.g., 99.999% during workdays and 99.9% for evenings or weekends), maximum permitted response times to queries or other invocations, requirements of actual physical location of stored data, or encryption or security requirements) or is within a range close to non-compliance of an SLA requirement, orchestration control plane 604 can instantiate one or more new VEEs to balance the workload among VEEs. As a workload drops, the extra VEEs can be torn down or deactivated, freeing resources to be allocated to another VEE (or the same VEE at a later time) to use when load reaches capacity. For example, a workload can include at least any type of activity such as protocol processing and network termination for packets or Memcached server, database or webserver. For example, VEE 606 can perform protocol processing, and if a workload increases, multiple instances of VEE 606 can be instantiated on switch 602.

In some examples, orchestration control plane 604 executing on switch 602 can determine whether to migrate any VEE executing on switch 602 or a server to execution on another server. For example, migration can depend on a shut down or restart of switch 602 on which the VEE executes, which can cause the VEE to be executed on a server. For example, VEE migration can depend on a shut down or restart of a server on which the VEE executes, which can cause the VEE to be executed on switch 602 or another server.

In some examples, orchestration control plane 604 can decide whether to execute a VEE on a particular processor or migrate the VEE among switch 602 or any server 608-0 to 608-N. VEE 606 or VEE 610 can migrate from a server to a switch, a switch to a server, or a server to another server as needed. For example, VEE 606 could execute on switch 602 for a short-term in connection with a server being rebooted and the VEE can be migrated back to the rebooted server or another server.

In some examples, switch 602 can execute a virtual switch (vSwitch) that allows communication between VEEs running on switch 602, or any server connected to switch 602. A virtual switch can include Microsoft Hyper-V, Open vSwitch, VMware vSwitches, and so forth.

Switch 602 can support S-IOV, SR-IOV, or MR-IOV for its VEEs. In this example, the VEE running on switch 602 utilizes resources in one or more servers via with S-IOV, SR-IOV, or MR-IOV. S-IOV, SR-IOV, or MR-IOV can permit connection or bus sharing across VEEs. In some examples, where a VEE running on switch 602 operates as a network termination proxy VEE, one or more corresponding VEEs run on one or more servers in the rack and in switch 602. VEEs running on switch 602 can process packets and VEEs running on cores on the server or switch 602 can execute applications (e.g., database, webserver, and so forth). Use of SIOV, SR-IOV, or MR-IOV (or other schemes) can allow the server resources to be composed whereby physically disaggregated servers are logically one system, but the tasks are divided such that the network processing occurs on switch 602.

As described earlier, switch 602 can use a high speed connection to at least some of the resources on one or more servers 608-0 to 608-N in a rack, providing access to resources from any of the servers in the rack to VEE 606 running on switch 602. Orchestration control plane 604 can efficiently allocate VEEs to resources and not be limited by what can execute in a single server, but also execute in switch 602 and servers 608-0 to 608-N. This feature allows for potentially constrained resources such as accelerators to be optimally allocated.

Figure 7A:
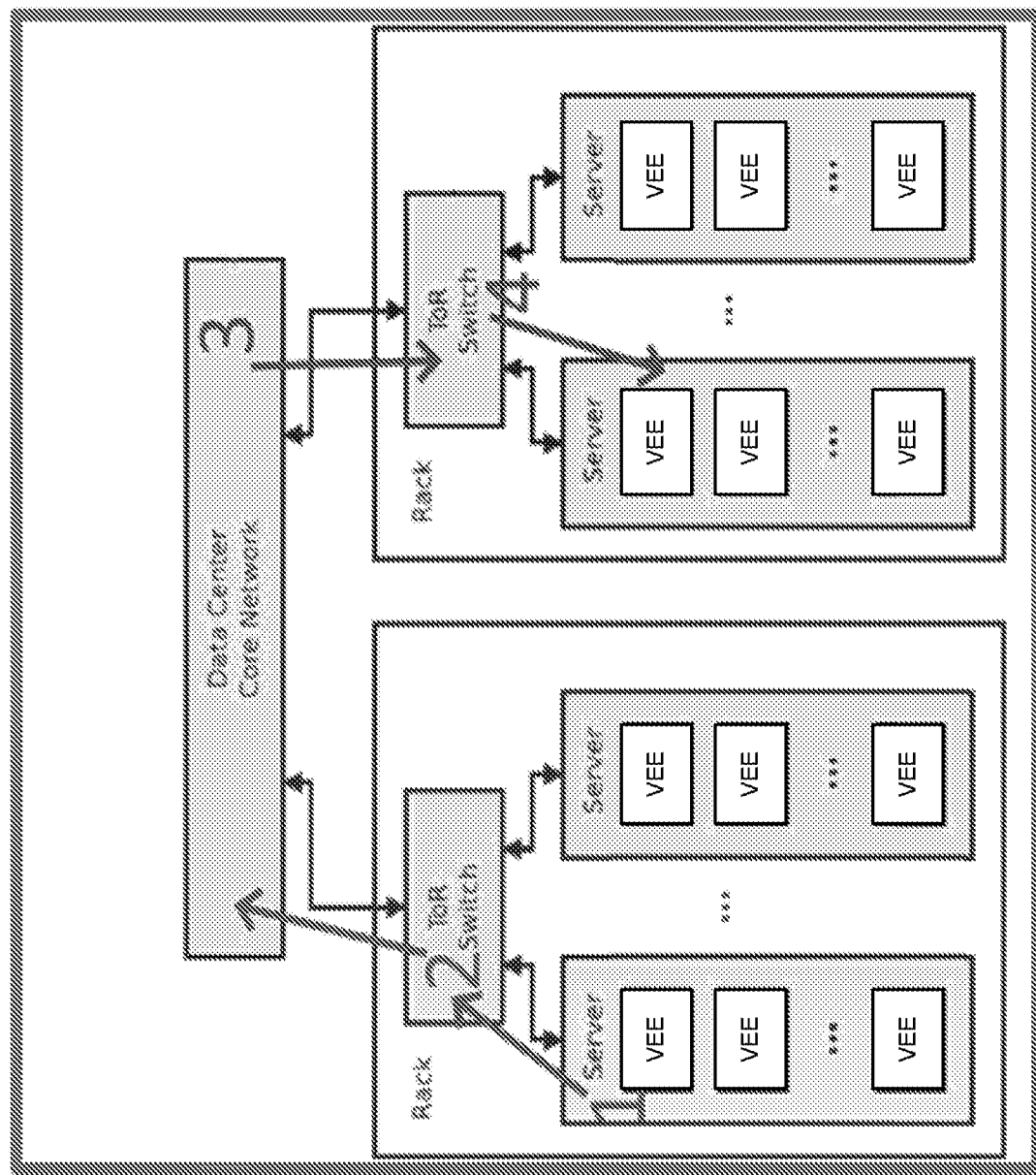
FIG. 7A depicts an example of migration of a virtualized execution environment from a server to another server.

FIG. 7A depicts an example of migration of a VEE from a server to another server. For example, live migration (e.g., Microsoft® HyperV or VMware® vSphere) of a VEE can be performed to migrate an active VEE. At (1), the VEE is transmitted to a TOR switch. At (2), the VEE is transmitted through a data center core network and at (3), the VEE is transmitted to a TOR switch of another rack. At (4), the VEE is transmitted to a server, where the VEE can commence execution in another hardware environment.

Figure 7B:
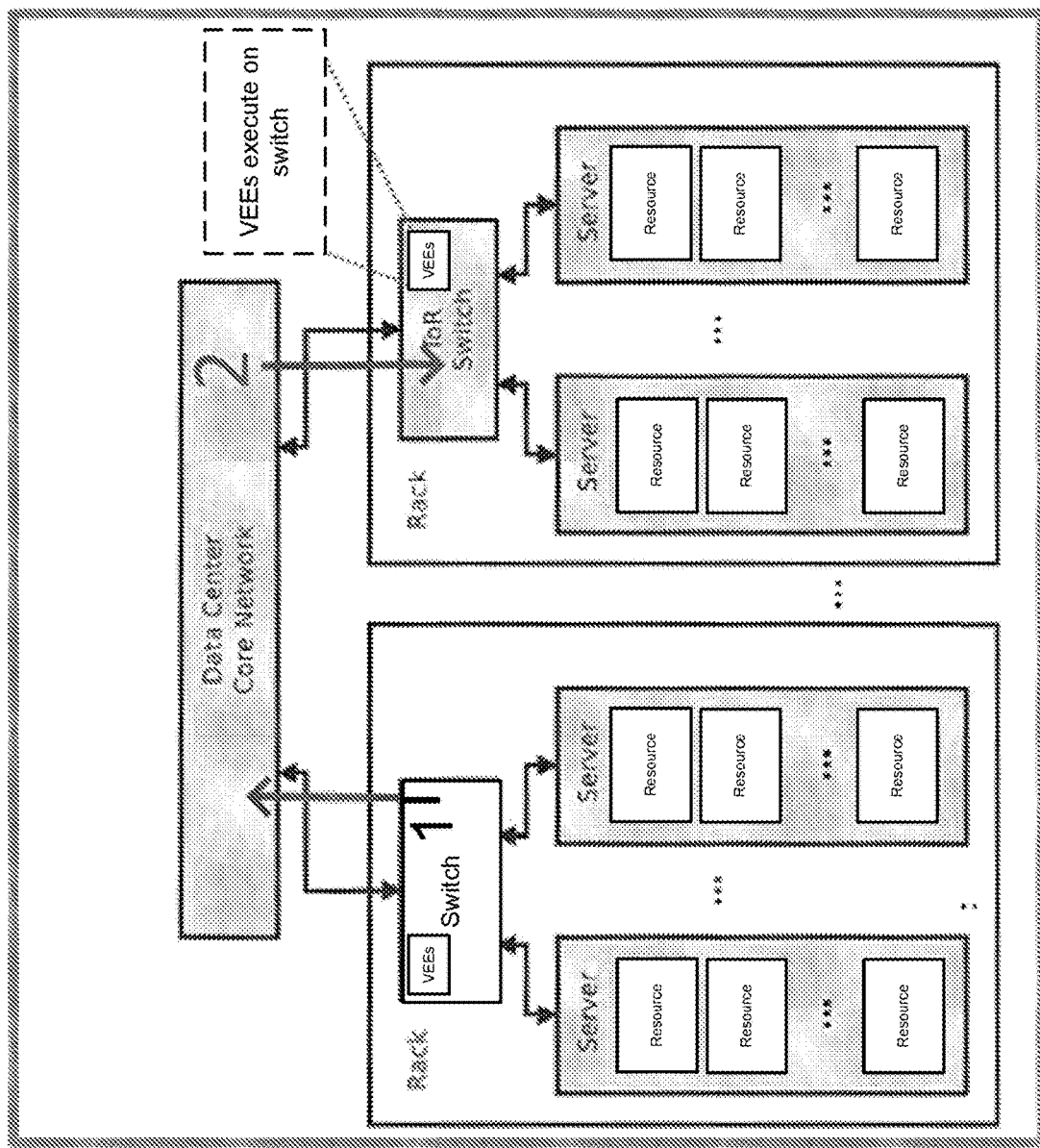
FIG. 7B depicts an example of migration of a virtualized execution environment.

FIG. 7B depicts an example of migration of a VEE. In this example, a VEE can be executed on a switch that uses resources of the switch and connected servers in the rack. At (1), the VEE is transmitted from the switch to the core network. At (2), the VEE is transmitted to another switch for execution. Another switch can use resources of the switch and connected servers in the rack. In other examples, the destination for the VEE can be a server, as in the example of FIG. 7A. Accordingly, by executing a VEE on a switch with expanded server resources, fewer steps are taken in migrating a VEE and the VEE can commence executing sooner in the scenario of FIG. 7B than in the scenario of FIG. 7A.

Figure 8A:
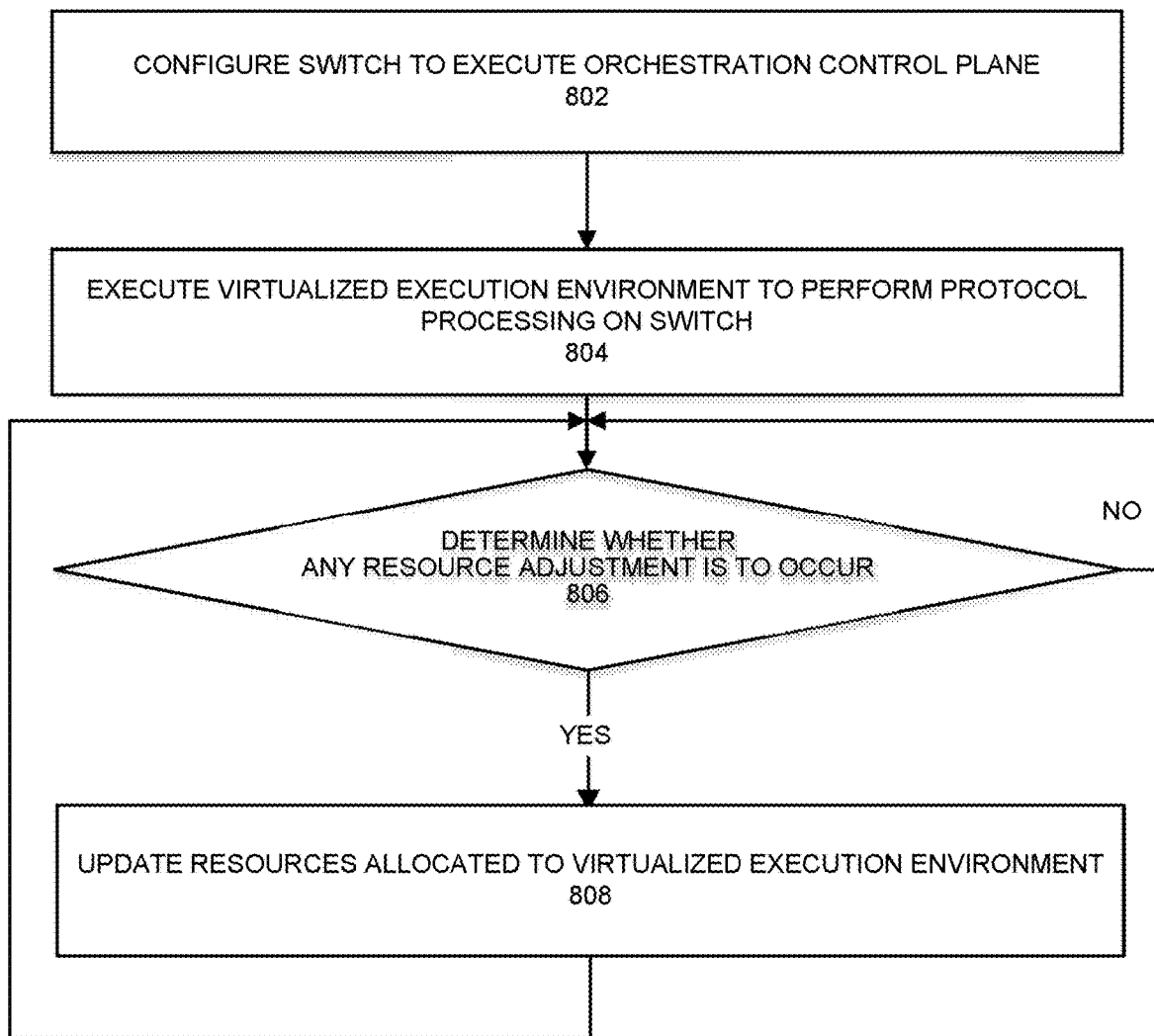
FIGS. 8A-8C depict example processes.

FIG. 8A depicts an example process. The process can be performed by a processor enhanced switch in accordance with various embodiments. At 802, a switch can be configured to execute an orchestration control plane. For example, the orchestration control plane can manage compute, memory, and software resources of the switch and one or more servers connected to the switch in a same rack as that of the switch. Servers can execute hypervisors that control execution of virtualized execution environments and also permit or do not permit configurations by the orchestration control plane. For example, the connection can be used to provide communication between the switch and the servers. The orchestration control plane can receive telemetry from servers in a rack via the connection without the telemetry contributing to east-west traffic within a data center. Various examples of the connection are described herein.

At 804, the switch can be configured to execute a virtualized execution environment to perform protocol processing for at least one virtualized execution environment executing on a server. Various examples of protocol processing are described herein. In some examples, the switch performs network termination of received packets and can provide data from received packets to a memory buffer of a server or the switch. However, a virtualized execution environment can perform any type of operation related to or unrelated to packet or protocol processing. For example, the virtualized execution environment can execute a Memcached server or retrieve data from memory devices in another rack or outside of the data center or a webserver or database.

At 806, orchestration control plane can determine resources whether to change an allocation of resources to the virtualized execution environment. For example, based on whether an applicable SLA for the virtualized execution environment or a flow of packets processed by the virtualized execution environment is being met or is not met, the orchestration control plane can determine whether to change an allocation of resources to the virtualized execution environment. For a scenario where the SLA is not being met or is considered likely to be violated, at 808, orchestration control plane can add additional computing, networking, or memory resources for use by the virtualized execution environment, or instantiate one or more additional virtualized execution environments to assist with processing. In some examples, the virtualized execution environment can be migrated from the switch to a server to improve resource availability.

For a scenario where the SLA is being met, the process returns to 806. Note that in some cases, where packet processing activity is low or idle, orchestration control plane can de-allocate computing resources available to the virtualized execution environment. In some examples, where the SLA is being met, the virtualized execution environment can be migrated from the switch to a server to provide resources for another virtualized execution environment to utilize.

Figure 8B:
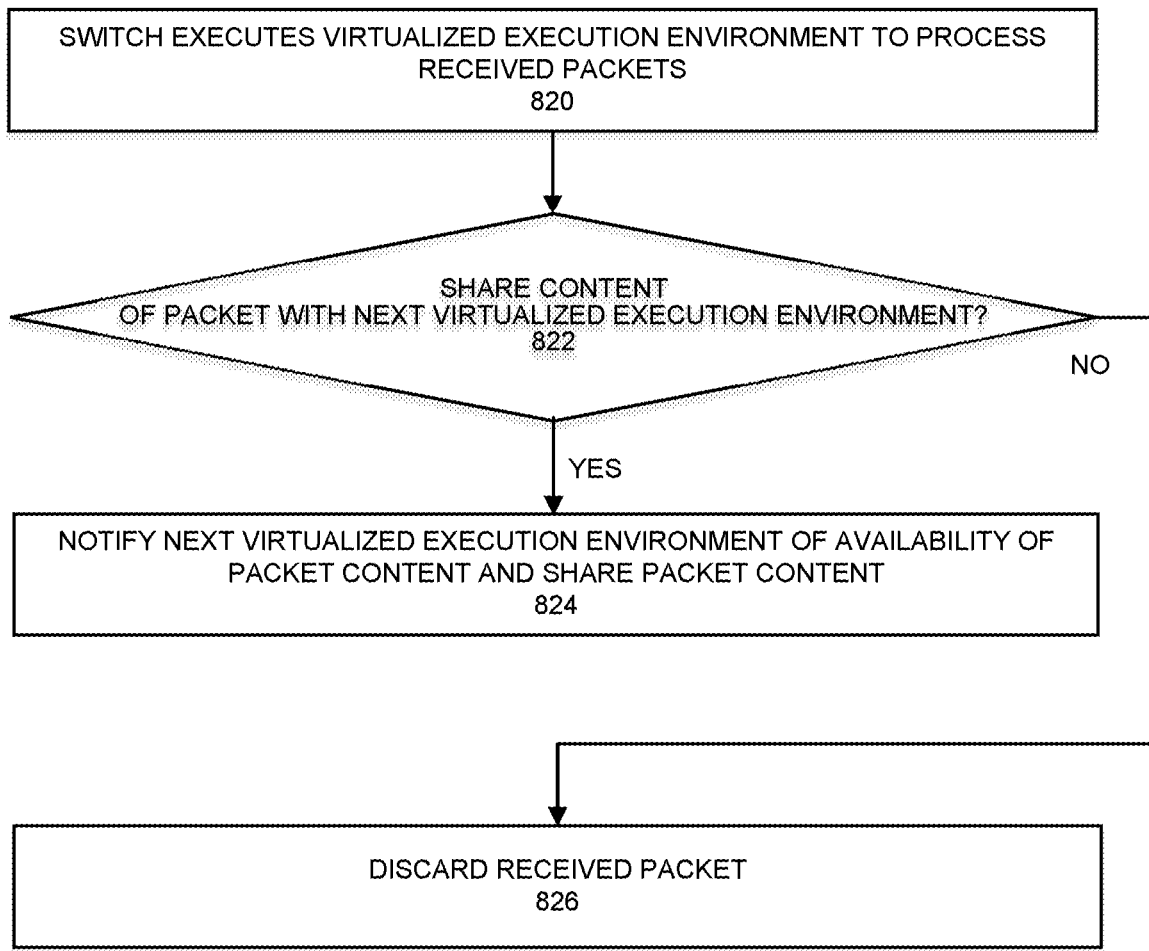

FIG. 8B depicts an example process. The process can be performed by a processor enhanced switch in accordance with various embodiments. At 820, a virtualized execution environment executing on a switch can perform packet processing of a received packet. Packet processing can include one or more of: header parsing, flow identification, segmentation, reassembly, acknowledgements (ACKs), negative-acknowledgements (NACKs), packet retransmit identification and requests, congestion management (e.g., flow control of a transmitter), checksum validation, decryption, encryption, or secure tunneling (e.g., Transport Layer Security (TLS) or Secure Sockets Layer (SSL)) or other operations. For example, the packet and protocol processing virtualized execution environment can perform polling, busy polling, or rely on interrupts to detect for new received packets received in a packet buffer from one or more ports. Based on detection of a new received packet, the virtualized execution environment can process the received packet.

At 822, the virtualized execution environment executing on the switch can determine whether data from the packet is to be made available or discarded. For example, if the packet is subject to a deny status on an access control list (ACL), the packet can be discarded. If the data is determined to be provided to a next virtualized execution environment, the process can continue to 824. If the packet is determined to be discarded, the process can continue to 826, where the packet discarded.

At 824, the virtualized execution environment can notify a virtualized execution environment executed on a server that data is available and provide the data for access by a virtualized execution environment executed on a server. The virtualized execution environment executed on the switch can cause the data to be copied to a buffer accessible to the virtualized execution environment executed on the server. For example, direct memory access (DMA), RDMA, or other direct copy scheme can be used to copy the data to the buffer. In other examples, the data is made available to a virtualized execution environment executed on the switch for processing.

Figure 8C:
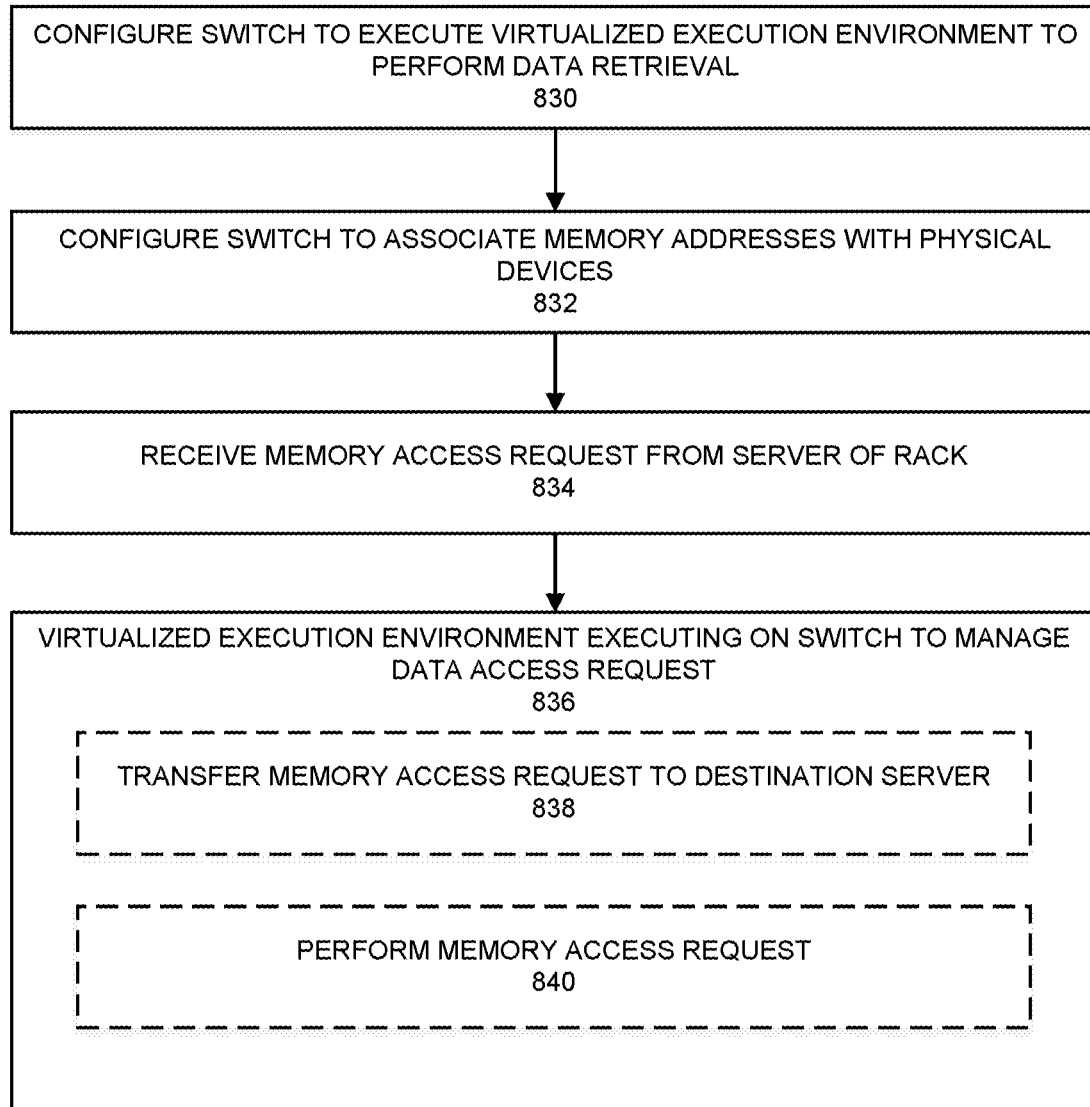

FIG. 8C depicts an example process. The process can be performed by a processor enhanced switch in accordance with various embodiments. At 830, the switch can be configured to execute a virtualized execution environment to perform retrieval of data from a device in the same or different rack as that of the switch or copying of data to a device in the same or different rack as that of the switch.

At 832, the virtualized execution environment can be configured with information on destination devices that are associated with memory addresses. For example, information can indicate a translation of a destination device or server (e.g., IP address or MAC address) that corresponds to a memory address in a memory transaction. For example, for a read memory transaction, the device or server can store data corresponding to the memory address and the data can be read from the memory address at the device or server. For example, for a write memory transaction, the device or server can receive and store data corresponding to the address for the write transaction.

At 834, the switch can receive a memory access request from a server of the same rack. At 836, the virtualized execution environment executing on the switch can manage the memory access request. In some examples, performance of 836 can include performance of 838, where the virtualized execution environment executing on the switch can transfer the memory access request to the destination server. In some examples, if a memory access request is to be sent to a server but the server does not store the requested data, the switch can re-direct the memory access request to the destination server that stores the requested data instead of sending the memory access request to the server, which in turn, sends the request to the destination server.

In some examples, performance of 836 can include performance of 840, where the virtualized execution environment executing on the switch can perform the memory access request. If the memory access request is a write command, the virtualized execution environment can write data to a memory address corresponding to the memory access request in a device in a same or different rack. If the memory access request is a read command, the virtualized execution environment can copy data from a memory address corresponding to the memory access request in a device in a same or different rack. For example, remote direct memory access can be used to write or read the data.

For a read request, the switch can locally cache the data for access by a server connected to the switch. In cases where an orchestration control plane manages memory resources of the switch and servers, the retrieved data can be stored in a memory device of the switch or any server such that any virtualized execution environment executed on any server of a rack can access or modify the data. For example, a memory device accessible to the switch and the servers of the rack can access the data as a near memory. In cases where the data is updated, the switch can write the updated data to the memory device that stores the data.

For example, block 840 can be performed in a scenario where the switch executes a Memcached server and data is stored in a server that is in a same rack as that of the switch. The Memcached server executing on the switch can respond to memory access request that corresponds to a cache miss by retrieving data from another server and storing the retrieved data in a cache in a memory or storage of the rack.

Figure 9:
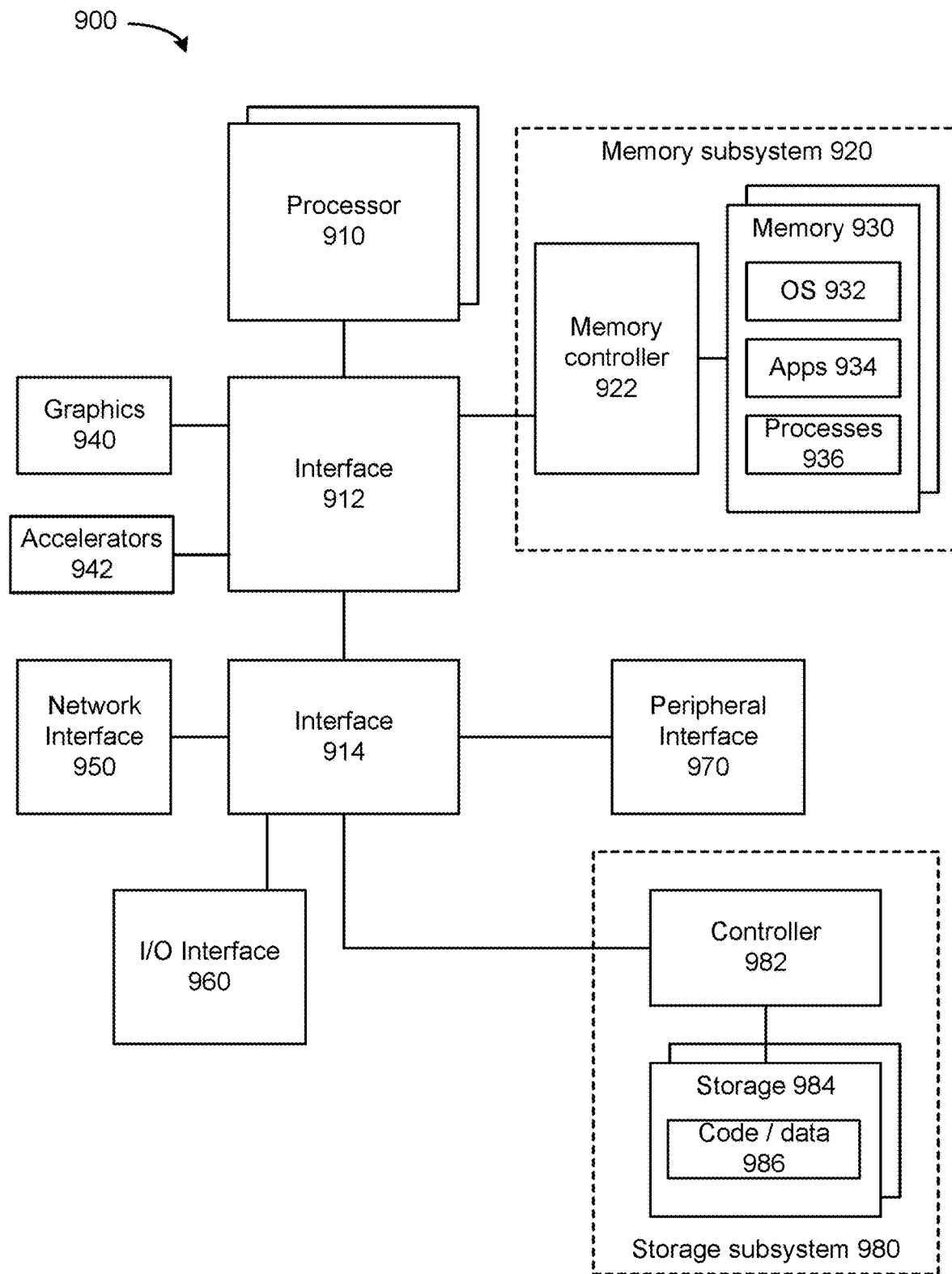
FIG. 9 depicts a system.

FIG. 9 depicts a system. The system can utilize a switch to manage resources in the system and perform other embodiments described herein. System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be programmable or fixed function offload engines that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random-access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a nonvolatile manner, such as one or more magnetic, solid state, or optical based disks, or a combination. Storage 984 holds code or instructions and data 986 in a persistent state (e.g., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (e.g., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random-Access Memory), or some variant such as Synchronous DRAM (SDRAM). Another example of volatile memory includes cache or static random-access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. For example, DDR or DDRx can refer to any version of DDR, where x is an integer.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

In an example, system 900 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick User Datagram Protocol Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 10:
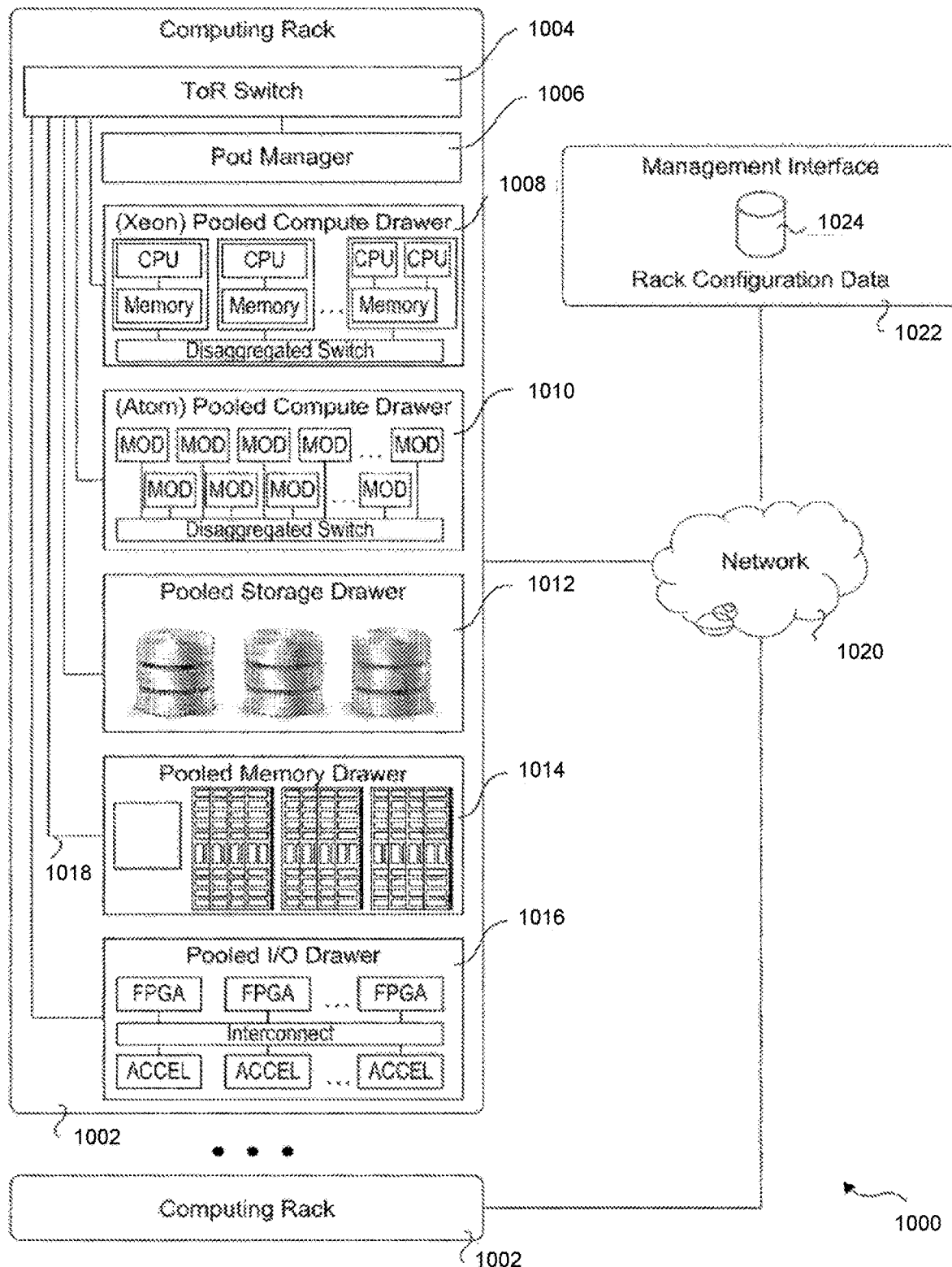
FIG. 10 depicts an environment.

FIG. 10 depicts an environment 1000 that includes multiple computing racks 1002, each including a Top of Rack (ToR) switch 1004, a pod manager 1006, and a plurality of pooled system drawers. Embodiments of the switch herein can be used to manage device resources, virtual execution environment operation, and data locality to a VEE (e.g., storage of data in the same rack as that which executes the VEE). Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1008, and Intel® ATOM™ pooled compute drawer 1010, a pooled storage drawer 1012, a pooled memory drawer 1014, and a pooled I/O drawer 1016. Each of the pooled system drawers is connected to ToR switch 1004 via a high-speed link 1018, such as a 40 Gigabit/second (Gb/s) or 100 Gb/s Ethernet link or a 100+Gb/s Silicon Photonics (SiPh) optical link.

Multiple of the computing racks 1002 may be interconnected via their ToR switches 1004 (e.g., to a pod-level switch or data center switch), as illustrated by connections to a network 1020. In some embodiments, groups of computing racks 1002 are managed as separate pods via pod manager(s) 1006. In one embodiment, a single pod manager is used to manage all of the racks in the pod. Alternatively, distributed pod managers may be used for pod management operations.

Environment 1000 further includes a management interface 1022 that is used to manage various aspects of the environment. This includes managing rack configuration, with corresponding parameters stored as rack configuration data 1024.

Figure 11:
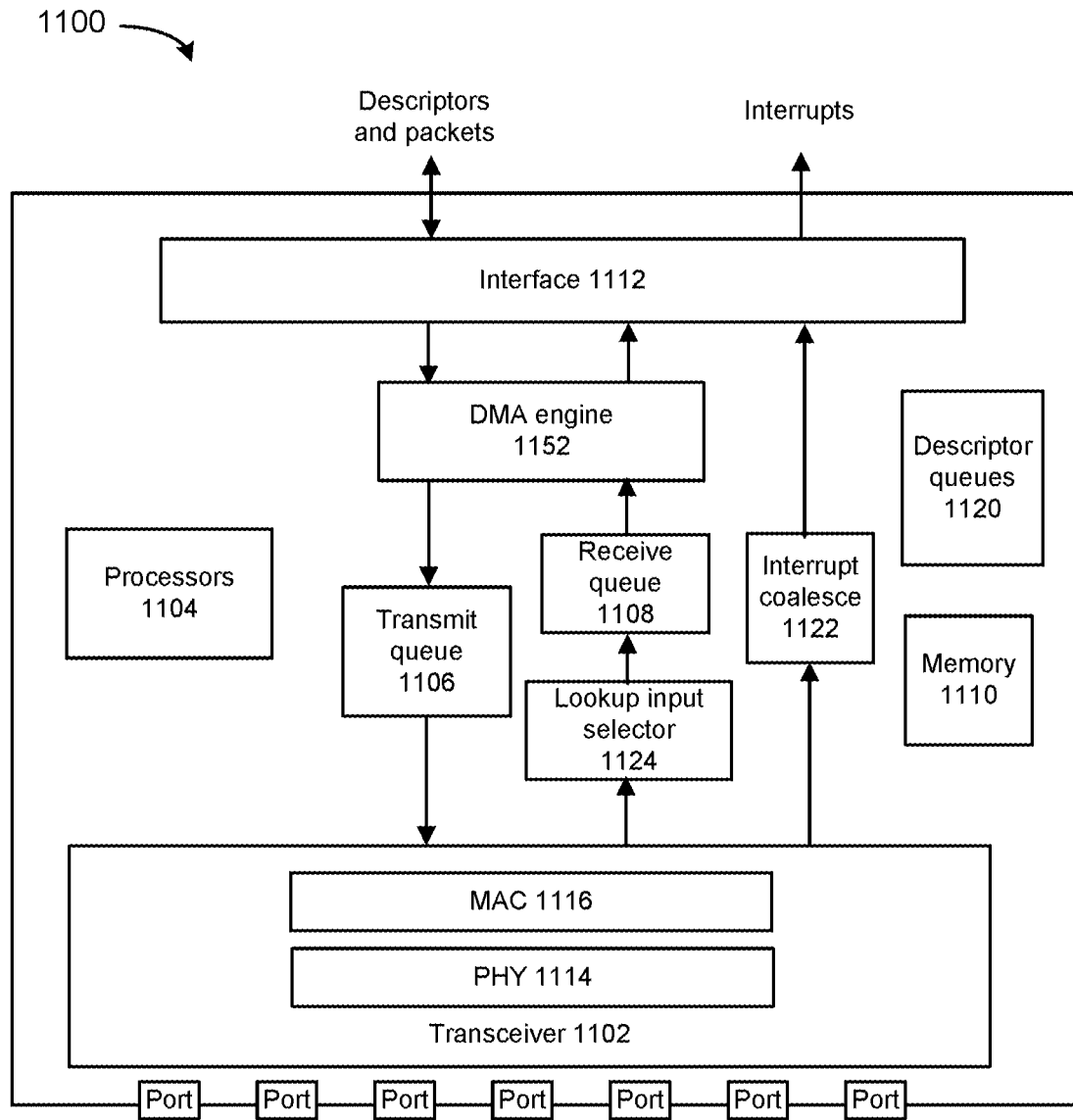
FIG. 11 depicts an example network element.

FIG. 11 depicts an example network element that can be used by embodiments of the switch herein. Various embodiments of a switch can perform any operations of network interface 1100. In some examples, network interface 110 can be implemented as a network interface controller, network interface card, a host fabric interface (HFI), host bus adapter (HBA). Network interface 1100 can be coupled to one or more servers using a bus, PCIe, CXL, or DDRx. Network interface 1100 may be embodied as part of a system-on-a-chip (SoC) that includes one or more processors, or included on a multichip package that also contains one or more processors.

Network interface 1100 can include transceiver 1102, processors 1104, transmit queue 1106, receive queue 1108, memory 1110, and bus interface 1112, and DMA engine 1152. Transceiver 1102 can be capable of receiving and transmitting packets in conformance with the applicable protocols such as Ethernet as described in IEEE 802.3, although other protocols may be used. Transceiver 1102 can receive and transmit packets from and to a network via a network medium (not depicted). Transceiver 1102 can include PHY circuitry 1114 and media access control (MAC) circuitry 1116. PHY circuitry 1114 can include encoding and decoding circuitry (not shown) to encode and decode data packets according to applicable physical layer specifications or standards. MAC circuitry 1116 can be configured to assemble data to be transmitted into packets, that include destination and source addresses along with network control information and error detection hash values. Processors 1104 can be any a combination of a: processor, core, graphics processing unit (GPU), field programmable gate array (FPGA), application specific integrated circuit (ASIC), or other programmable hardware device that allow programming of network interface 1100. For example, processors 1104 can provide for identification of a resource to use to perform a workload and generation of a bitstream for execution on the selected resource. For example, a "smart network interface" can provide packet processing capabilities in the network interface using processors 1104.

Packet allocator 1124 can provide distribution of received packets for processing by multiple CPUs or cores using timeslot allocation described herein or RSS. When packet allocator 1124 uses RSS, packet allocator 1124 can calculate a hash or make another determination based on contents of a received packet to determine which CPU or core is to process a packet.

Interrupt coalesce 1122 can perform interrupt moderation whereby network interface interrupt coalesce 1122 waits for multiple packets to arrive, or for a time-out to expire, before generating an interrupt to host system to process received packet(s). Receive Segment Coalescing (RSC) can be performed by network interface 1100 whereby portions of incoming packets are combined into segments of a packet. Network interface 1100 provides this coalesced packet to an application.

Direct memory access (DMA) engine 1152 can copy a packet header, packet payload, and/or descriptor directly from host memory to the network interface or vice versa, instead of copying the packet to an intermediate buffer at the host and then using another copy operation from the intermediate buffer to the destination buffer. In some examples, DMA engine 1152 can perform writes of data to any cache such as by using Data Direct I/O (DDIO).

Memory 1110 can be any type of volatile or non-volatile memory device and can store any queue or instructions used to program network interface 1100. Transmit queue 1106 can include data or references to data for transmission by network interface. Receive queue 1108 can include data or references to data that was received by network interface from a network. Descriptor queues 1120 can include descriptors that reference data or packets in transmit queue 1106 or receive queue 1108. Bus interface 1112 can provide an interface with host device (not depicted). For example, bus interface 1112 can be compatible with PCI, PCI Express, PCI-x, PHY Interface for the PCI Express (PIPE), Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores," may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a method comprising a switch device for a rack of two or more physical servers, wherein the switch device is coupled to the two or more physical servers and the switch device performs packet protocol processing termination for received packets and provides payload data from the received packets without a received packet header to a destination buffer of a destination physical server in the rack.

Example 2 includes any example, wherein the switch device comprises at least one central processing unit, the at least one central processing unit is to execute packet processing operations on the received packets.

Example 3 includes any example, wherein a physical server executes at least one virtualized execution environments (VEE) and the at least one central processing unit executes a VEE for packet processing of packets with data to be accessed by the physical server that executes the VEE.

Example 4 includes any example, wherein the switch device stores a mapping of memory addresses and corresponding destination devices, and based on receipt of a memory transaction from a physical server in the rack, the switch device performs the memory transaction.

Example 5 includes any example, wherein the switch device performs the memory transaction comprises: for a read request, the switch device retrieves data from a physical server connected to the rack or another device of a different rack based on the mapping and stores the data into a memory managed by the switch device.

Example 6 includes any example, wherein the switch device stores a mapping of memory addresses and corresponding destination devices, and based on receipt of a memory transaction from a physical server in the rack: based on a memory address associated with the memory transaction being associated with a destination server in another rack according to the mapping, transmitting the memory transaction to the destination server, receiving a response to the memory transaction, and storing the response in a memory of the rack.

Example 7 includes any example, wherein the switch device comprises at least one central processing unit, the at least one central processing unit to execute a control plane for one or more physical servers that are part of the rack and the control plane to collect telemetry data from the one or more physical servers and based on the telemetry data, perform one or more of: allocation of execution of a virtualized execution environment (VEE) to a physical server of the rack, migration of a VEE from a physical server of the rack to execution on at least one central processing unit of the switch device, migration of a VEE from a physical server of the rack to execution on another physical server of the rack, or allocation of memory of a physical server of the rack for access by a VEE executing on a physical server of the rack.

Example 8 includes any example, wherein the switch device comprises at least one central processing unit, the at least one central processing unit to execute a control plane for one or more physical servers that are part of the rack and the control plane distributes execution of virtualized execution environment (VEEs) among one or more physical servers of the rack and selectively terminates a VEE or migrates a VEE to execution on another physical server of the rack or on the switch device.

Example 9 includes any example, and includes an apparatus comprising: a switch comprising: at least one processor, wherein the at least one processor is to perform packet termination processing of a received packet and copy payload data from the received packet without an associated received packet header to a destination buffer of a destination physical server through a connection.

Example 10 includes any example, wherein the at least one processor is to execute a virtualized execution environment (VEE) and wherein the VEE is to perform the packet termination processing.

Example 11 includes any example, wherein based on receipt of a memory transaction from a physical server through the connection, the at least one processor is to perform the memory transaction based on a mapping of memory addresses and corresponding destination devices.

Example 12 includes any example, wherein to perform the memory transaction, the at least one processor is to: for a read request: retrieve data from a physical server connected to the at least one processor through the connection or another device of a different rack and store the data into a memory managed by the at least one processor.

Example 13 includes any example, wherein: based on receipt of a memory transaction from a physical server in a rack associated with the switch: based a memory address associated with the memory transaction being associated with a destination server in another rack according to a mapping of memory addresses and corresponding destination devices, the at least one processor is to cause transmission of the memory transaction to the destination server, the at least one processor is to access a response to the memory transaction, and the at least one processor is to cause the response to be stored in a memory of the rack.

Example 14 includes any example, wherein: the at least one processor is to execute a control plane for one or more physical servers that are part of a rack associated with the switch and the control plane is to collect telemetry data from the one or more physical servers and based on the telemetry data, perform one or more of: allocation of execution of a virtualized execution environment (VEE) to a physical server of the rack, migration of a VEE from a physical server of the rack to execution on the at least one central processing unit of the switch, migration of a VEE from a physical server of the rack to execution on another physical server of the rack, or allocation of memory of a server of the rack for access by a VEE executing on a physical server of the rack.

Example 15 includes any example, wherein: the at least one processor is to execute a control plane for one or more physical servers that are part of a rack associated with the switch and the control plane is to distribute execution of virtualized execution environment (VEEs) among one or more physical servers of the rack and selectively terminate a VEE or migrate a VEE to execution on another physical server of the rack or at least one processor that is part of the switch.

Example 16 includes any example, wherein the connection is compatible with one or more of: Peripheral Component Interconnect express (PCIe), Compute Express Link (CXL), or any type of Double Data Rate (DDR).

Example 17 includes any example, and includes at least one non-transitory computer-readable medium comprising instructions stored thereon, that if executed by a switch, cause the switch to: execute a control plane at the switch to collect telemetry data from one or more physical servers and based on the telemetry data, perform one or more of: allocation of execution of a virtualized execution environment (VEE) to a physical server of a rack that includes the switch, migration of a VEE from a physical server of the rack to execution on at least one central processing unit of the switch, migration of a VEE from a physical server of the rack to execution on another physical server of the rack, or allocation of memory of a server of the rack for access by a VEE executing on a physical server of the rack.

Example 18 includes any example, comprising instructions stored thereon, that if executed by a switch, cause the switch to: store a mapping of memory addresses and corresponding destination devices and based on receipt of a memory transaction from a physical server through a connection and based on mapping of memory addresses and corresponding destination devices, the switch is to retrieve data from a physical server connected to the switch through the connection or another device of a different rack and store the data into a memory managed by the switch.

Example 19 includes any example, comprising instructions stored thereon, that if executed by a switch, cause the switch to: store a mapping of memory addresses and corresponding destination devices, and based on receipt of a memory transaction from a server in a rack associated with the switch: based a memory address associated with the memory transaction being associated with a destination server in another rack according to the mapping, the switch is to transmit the memory transaction to the destination server, the switch is to receive a response to the memory transaction, and the switch is to store the response in a memory of the rack.

Example 20 includes any example, a connection between the switch and one or more physical servers of the rack is compatible with one or more of: Peripheral Component Interconnect express (PCIe), Compute Express Link (CXL), or any type of Double Data Rate (DDR).

Example 21 includes any example, and includes a network device comprising: circuitry to perform network protocol termination for received packets; at least one Ethernet port; and multiple connections to be connected to different physical servers in a rack, wherein the circuitry to perform network protocol termination for received packets is to provide a payload of a received packet without an associated header to a physical server.

What is claimed is:

1. A packaged integrated circuit, the packaged integrated circuit being configurable to be used in switching operations in association with at least one network, multiple graphics processing units (GPUs), multiple compute express link (CXL).mem memory devices, and multiple central processing units (CPUs), the packaged integrated circuit comprising:
    interface circuitry to be communicatively coupled to the at least one network, the multiple GPUs, the multiple CXL.mem memory devices, and the multiple CPUs; and
    switch circuitry to implement the switching operations in association with respective data communication processing, the switching operations to be carried out via the interface circuitry in association with the at least one network, the multiple GPUs, the multiple CXL.mem devices, and the multiple CPUs;
    wherein:
        the multiple CXL.mem devices are to be in a pooled configuration;
        the switch circuitry is to carry out, at least in part, the respective data communication processing that is in association with the at least one network in accordance with remote direct memory access (RDMA) over Converged Ethernet (RoCE) protocol;

the switch circuitry is to carry out, at least in part, the respective data communication processing that is in association with the multiple GPUs and the multiple CPUs in accordance with peripheral component interconnect express (PCIe) protocol;

the switch circuitry is to carry out, at least in part, the respective data communication processing that is in association with the multiple CXL.mem memory devices in accordance with CXL protocol;

the switch circuitry is to implement the switching operations and/or the respective data communication processing in association with compute and/or accelerator resource aggregation and/or compute and/or accelerator resource composition;

the switching operations and/or the respective communication processing are software programmable, at least in part; and the switch circuitry is to carry out, at least in part, the respective data communication processing that is in association with the multiple CXL.mem memory devices in association with memory page data transfer.

2. The packaged integrated circuit of claim 1, wherein:
the packaged integrated circuit comprises a system-on-chip.

3. The packaged integrated circuit of claim 2, wherein:
the packaged integrated circuit is to implement control plane/management processes in association with the switching operations and/or the respective data communication processing.

4. The packaged integrated circuit of claim 3, wherein:
the packaged integrated circuit is to implement congestion control and load balancing in association with the switching operations and/or the respective data communication processing.

5. The packaged integrated circuit of claim 4, wherein:
the GPUs are configurable to implement operations associated with artificial intelligence and/or machine learning models.

6. The packaged integrated circuit of claim 5, wherein:
the packaged integrated circuit is to be comprised in a multi-switch network.

7. The packaged integrated circuit of claim 6, wherein:
the packaged integrated circuit comprises an application specific integrated circuit.

8. A method implemented using a packaged integrated circuit, the packaged integrated circuit being configurable to be used in switching operations in association with at least one network, multiple graphics processing units (GPUs), multiple compute express link (CXL).mem memory devices, and multiple central processing units (CPUs), the packaged integrated circuit comprising interface circuitry and switch circuitry, the interface circuitry to be communicatively coupled to the at least one network, the multiple GPUs, the multiple CXL.mem memory devices, and the multiple CPUs, the method comprising:

implementing, using the switch circuitry, switching operations in association with respective data communication processing, the switching operations to be carried out via the interface circuitry in association with the at least one network, the multiple GPUs, the multiple CXL.mem devices, and the multiple CPUs;

wherein:
the multiple CXL.mem devices are to be in a pooled configuration;

the switch circuitry is to carry out, at least in part, the respective data communication processing that is in association with the at least one network in accordance with remote direct memory access (RDMA) over Converged Ethernet (RoCE) protocol;

the switch circuitry is to carry out, at least in part, the respective data communication processing that is in association with the multiple GPUs and the multiple CPUs in accordance with peripheral component interconnect express (PCIe) protocol;

the switch circuitry is to carry out, at least in part, the respective data communication processing that is in association with the multiple CXL.mem memory devices in accordance with CXL protocol;

the switch circuitry is to implement the switching operations and/or the respective data communication processing in association with compute and/or accelerator resource aggregation and/or compute and/or accelerator resource composition; and the switch circuitry is to carry out, at least in part, the respective data communication processing that is in association with the multiple CXL.mem memory devices in association with memory page data transfer.

9. The method of claim 8, wherein:
the packaged integrated circuit comprises a system-on-chip.

10. The method of claim 9, wherein:
the packaged integrated circuit is to implement control plane/management processes in association with the switching operations and/or the respective data communication processing.

11. The method of claim 10, wherein:
the packaged integrated circuit is to implement congestion control and load balancing in association with the switching operations and/or the respective data communication processing.

12. The method of claim 11, wherein:
the GPUs are configurable to implement operations associated with artificial intelligence and/or machine learning models.

13. The method of claim 12, wherein:
the packaged integrated circuit is to be comprised in a multi-switch network.

14. The method of claim 13, wherein:
the packaged integrated circuit comprises an application specific integrated circuit.

15. At least one non-transitory machine-readable storage medium storing instructions to be executed by a packaged integrated circuit, the packaged integrated circuit being configurable to be used in switching operations in association with at least one network, multiple graphics processing units (GPUs), multiple compute express link (CXL).mem memory devices, and multiple central processing units (CPUs), the packaged integrated circuit comprising interface circuitry and switch circuitry, the interface circuitry to be communicatively coupled to the at least one network, the multiple GPUs, the multiple CXL.mem memory devices, and the multiple CPUs, the instructions, when executed by the packaged integrated circuit, resulting in performance of operations comprising:

implementing, using the switch circuitry, switching operations in association with respective data communication processing, the switching operations to be carried out via the interface circuitry in association with the at least one network, the multiple GPUs, the multiple CXL.mem devices, and the multiple CPUs;

wherein:
  the multiple CXL.mem devices are to be in a pooled configuration;
  the switch circuitry is to carry out, at least in part, the respective data communication processing that is in association with the at least one network in accordance with remote direct memory access (RDMA) over Converged Ethernet (RoCE) protocol;
  the switch circuitry is to carry out, at least in part, the respective data communication processing that is in association with the multiple GPUs and the multiple CPUs in accordance with peripheral component interconnect express (PCIe) protocol;
  the switch circuitry is to carry out, at least in part, the respective data communication processing that is in association with the multiple CXL.mem memory devices in accordance with CXL protocol;
  the switch circuitry is to implement the switching operations and/or the respective data communication processing in association with compute and/or accelerator resource aggregation and/or compute and/or accelerator resource composition;
  the switching operations and/or the respective data communication processing are software programmable, at least in part; and
  the switch circuitry is to carry out, at least in part, the respective data communication processing that is in association with the multiple CXL.mem memory devices in association with memory page data transfer.

16. The at least one non-transitory machine-readable storage medium of claim 15, wherein:
  the packaged integrated circuit comprises a system-on-chip.

17. The at least one non-transitory machine-readable storage medium of claim 16, wherein:
  the packaged integrated circuit is to implement control plane/management processes in association with the switching operations and/or the respective data communication processing.

18. The at least one non-transitory machine-readable storage medium of claim 17, wherein:
  the packaged integrated circuit is to implement congestion control and load balancing in association with the switching operations and/or the respective data communication processing.

19. The at least one non-transitory machine-readable storage medium of claim 18, wherein:
  the GPUs are configurable to implement operations associated with artificial intelligence and/or machine learning models.

20. The at least one non-transitory machine-readable storage medium of claim 19, wherein:
  the packaged integrated circuit is to be comprised in a multi-switch network.

21. The at least one non-transitory machine-readable storage medium of claim 20, wherein:
  the packaged integrated circuit comprises an application specific integrated circuit.

22. A server system for use in association with at least one network, multiple graphics processing units (GPUs), multiple compute express link (CXL).mem memory devices, and multiple central processing units (CPUs), the server system comprising:
  a packaged integrated circuit, the packaged integrated circuit to be used in switching operations in association with the at least one network, the multiple GPUs, the multiple CXL.mem memory devices, and the multiple CPUs, the packaged integrated circuit comprising:
    interface circuitry to be communicatively coupled to the at least one network, the multiple GPUs, the multiple CXL.mem memory devices, and the multiple CPUs; and
    switch circuitry to implement the switching operations in association with respective data communication processing, the switching operations to be carried out via the interface circuitry in association with the at least one network, the multiple GPUs, the multiple CXL.mem devices, and the multiple CPUs;
  wherein:
    the multiple CXL.mem devices are to be in a pooled configuration;
    the switch circuitry is to carry out, at least in part, the respective data communication processing that is in association with the at least one network in accordance with remote direct memory access (RDMA) over Converged Ethernet (RoCE) protocol;
    the switch circuitry is to carry out, at least in part, the respective data communication processing that is in association with the multiple GPUs and the multiple CPUs in accordance with peripheral component interconnect express (PCIe) protocol;
    the switch circuitry is to carry out, at least in part, the respective data communication processing that is in association with the multiple CXL.mem memory devices in accordance with CXL protocol;
    the switch circuitry is to implement the switching operations and/or the respective data communication processing in association with compute and/or accelerator resource aggregation and/or compute and/or accelerator resource composition;
    the switching operations and/or the respective data communication processing are software programmable, at least in part; and
    the switch circuitry is to carry out, at least in part, the respective data communication processing that is in association with the multiple CXL.mem memory devices in association with memory page data transfer.

23. The server system of claim 22, wherein:
the packaged integrated circuit comprises a system-on-chip.

24. The server system of claim 23, wherein:
the packaged integrated circuit is to implement control plane/management processes in association with the switching operations and/or the respective data communication processing.

25. The server system of claim 24, wherein:
the packaged integrated circuit is to implement congestion control and load balancing in association with the switching operations and/or the respective data communication processing.

26. The server system of claim 25, wherein:
the GPUs are configurable to implement operations associated with artificial intelligence and/or machine learning models.

27. The server system of claim 26, wherein:
the packaged integrated circuit is to be comprised in a multi-switch network.

28. The server system of claim 27, wherein:
the packaged integrated circuit comprises an application specific integrated circuit.

29. A data center system for use in association with at least one network, the data center system comprising:

one or more server systems comprising multiple graphics processing units (GPUs), multiple compute express link (CXL).mem memory devices, and multiple central processing units (CPUs), the one or more server systems also comprising a packaged integrated circuit, the packaged integrated circuit to be used in switching operations in association with the at least one network, the multiple GPUs, the multiple CXL.mem memory devices, and the multiple CPUs, the packaged integrated circuit comprising:

interface circuitry to be communicatively coupled to the at least one network, the multiple GPUs, the multiple CXL.mem memory devices, and the multiple CPUs; and switch circuitry to implement the switching operations in association with respective data communication processing, the switching operations to be carried out via the interface circuitry in association with the at least one network, the multiple GPUs, the multiple CXL.mem devices, and the multiple CPUs;

wherein:

the multiple CXL.mem devices are to be in a pooled configuration;

the switch circuitry is to carry out, at least in part, the respective data communication processing that is in association with the at least one network in accordance with remote direct memory access (RDMA) over Converged Ethernet (RoCE) protocol;

the switch circuitry is to carry out, at least in part, the respective data communication processing that is in association with the multiple GPUs and the multiple CPUs in accordance with peripheral component interconnect express (PCIe) protocol;

the switch circuitry is to carry out, at least in part, the respective data communication processing that is in association with the multiple CXL.mem memory devices in accordance with CXL protocol;

the switch circuitry is to implement the switching operations and/or the respective data communication processing in association with compute and/or accelerator resource aggregation and/or compute and/or accelerator resource composition;

the switching operations and/or the respective data communication processing are software programmable, at least in part; and the switch circuitry is to carry out, at least in part, the respective data communication processing that is in association with the multiple CXL.mem memory devices in association with memory page data transfer.

30. The data center system of claim 29, wherein:
the one or more server systems comprise multiple server systems; and
the packaged integrated circuit comprises a system-on-chip.

31. The data center system of claim 30, wherein:
the packaged integrated circuit is to implement control plane/management processes in association with the switching operations and/or the respective data communication processing.

32. The data center system of claim 31, wherein:
the packaged integrated circuit is to implement congestion control and load balancing in association with the switching operations and/or the respective data communication processing.

33. The data center system of claim 32, wherein:
the GPUs are configurable to implement operations associated with artificial intelligence and/or machine learning models.

34. The data center system of claim 33, wherein:
the packaged integrated circuit is to be comprised in a multi-switch network.

35. The data center system of claim 34, wherein:
the packaged integrated circuit comprises an application specific integrated circuit.

* * * * *